(12) United States Patent
Mutsuda et al.

(10) Patent No.: US 8,871,152 B2
(45) Date of Patent: *Oct. 28, 2014

(54) EXHAUST GAS PROCESSING DEVICE

(71) Applicant: Ibiden Co., Ltd., Ogaki (JP)

(72) Inventors: Fumiyuki Mutsuda, Ibi-Gun (JP);
Yoshitaka Fujita, Ibi-Gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/151,221

(22) Filed: Jan. 9, 2014

(65) Prior Publication Data
US 2014/0127086 A1 May 8, 2014

Related U.S. Application Data

(63) Continuation of application No. 13/278,198, filed on Oct. 21, 2011, now Pat. No. 8,658,103.

(30) Foreign Application Priority Data

Jan. 6, 2011 (WO) .................. PCT/JP2011/050095

(51) Int. Cl.
*B01D 50/00* (2006.01)
(52) U.S. Cl.
USPC ............................ 422/179; 422/180; 422/174
(58) Field of Classification Search
USPC ............................ 422/174, 179, 180; 138/149
See application file for complete search history.

(56) References Cited

U.S. PATENT DOCUMENTS

| | | |
|---|---|---|
| 5,070,694 A | 12/1991 | Whittenberger |
| 5,992,560 A | 11/1999 | Matsuoka et al. |
| 6,077,483 A * | 6/2000 | Locker et al. ................. 422/179 |
| 6,670,020 B1 | 12/2003 | Maus |
| 2004/0177609 A1 * | 9/2004 | Moore et al. .................... 60/323 |
| 2005/0186127 A1 | 8/2005 | Reck et al. |
| 2007/0009402 A1 | 1/2007 | Wirth et al. |
| 2009/0060800 A1 | 3/2009 | Fernandes, Jr. |
| 2010/0239469 A1 | 9/2010 | Olivier et al. |

FOREIGN PATENT DOCUMENTS

| | | |
|---|---|---|
| DE | 102005019182 | 10/2006 |
| FR | 2847618 | 5/2004 |
| GB | 2425073 | 10/2006 |
| JP | 49-124412 | 10/1974 |
| JP | 2010-229979 | 10/2010 |
| JP | 2010-270653 | 12/2010 |

OTHER PUBLICATIONS

Akshaya Jona et al., "Characterization of Pore Structure of Filter Media", (Fluid/Particle Separation Journal vol. 14, No. 3, pp. 227-241).
Extended European Search Report for corresponding EP Application No. 11180372.2-1263, Feb. 1, 2012.

* cited by examiner

*Primary Examiner* — Tom Duong
(74) *Attorney, Agent, or Firm* — Mori & Ward, LLP

(57) ABSTRACT

An exhaust gas processing device includes a first cylindrical metallic member, an inorganic mat member, a second cylindrical metallic member, and an insulating layer. The inorganic mat member is wound around an outer periphery of the first cylindrical metallic member. The second cylindrical metallic member accommodates the first cylindrical metallic member around which the inorganic mat member is wound. The insulating layer have a thickness of about 20 μm to about 400 μm and is provided at at least one of a first part which is an inner surface of the first cylindrical metallic member, a second part between an outer surface of the first cylindrical metallic member and the inorganic mat member, and a third part between an inner surface of the second cylindrical metallic member and the inorganic mat member.

18 Claims, 19 Drawing Sheets

EXHAUST GAS PROCESSING DEVICE

CROSS-REFERENCE TO RELATED APPLICATIONS

The present application is a continuation application of the U.S. patent application Ser. No. 13/278,198 filed Oct. 21, 2011, which claims priority under 35 U.S.C. §119 to International Application No. PCT/JP2011/050095, filed in Japan on Jan. 6, 2011. The contents of these applications are incorporated herein by reference in their entirety.

BACKGROUND OF THE INVENTION

1. Field of the Invention

The present invention generally relates to an exhaust gas processing device.

2. Discussion of the Background

Many technologies are developed for purification of exhaust gas emitted from automobiles. However, increasing traffic is making countermeasures for the exhaust gas insufficient. On a global mass scale, automobile exhaust gas regulations are being made strict.

In order to deal with the automobile exhaust gas regulations, catalytic agent carriers capable of processing predetermined toxic substances contained in the exhaust gas are used in an exhaust gas treatment system. A honeycomb structure is known as a member for the catalytic agent carrier.

The honeycomb structure includes plural cells or penetrating holes extending from one end surface of the honeycomb structure to the other end surface of the honeycomb structure in its longitudinal direction. The cells are formed in honeycomb units mutually separated by cell walls and carrying the catalytic agent. Therefore, if the exhaust gas passes through the honeycomb structure, the catalytic agent carried by the cell walls may reform the exhaust gas by oxidizing or reducing materials such as hydrocarbon compounds (HC), carbon monoxide (CO), and nitrogen oxide (NOx) contained in the exhaust gas to process the components in the exhaust gas.

The cell walls (base material) of the honeycomb units forming the above honeycomb structure may be made of cordierite. A catalytic agent carrying layer made of γ-alumina is formed on the cell wall. A noble metal catalytic agent such as platinum and rhodium is carried by the catalytic agent carrying layer.

Further, a honeycomb unit made of a material having a lower electrical resistivity such as silicon carbide than that of cordierite may be used in order to enhance the exhaust gas processing capability at a temperature lower than a temperature causing the catalytic agent to be active. An electrode for applying a voltage is provided in the honeycomb structure and electrical power is applied to the honeycomb structure to heat the honeycomb structure (Japanese Laid-open Utility Model Publication No. 49-124412).

The entire contents of Japanese Laid-open Utility Model Publication No. 49-124412 are incorporated herein by reference.

SUMMARY OF THE INVENTION

According to one aspect of the present invention, an exhaust gas processing device includes a first cylindrical metallic member, an inorganic mat member, a second cylindrical metallic member, and an insulating layer. The inorganic mat member is wound around an outer periphery of the first cylindrical metallic member. The second cylindrical metallic member accommodates the first cylindrical metallic member around which the inorganic mat member is wound. The insulating layer have a thickness of about 20 μm to about 400 μm and is provided at at least one of a first part which is an inner surface of the first cylindrical metallic member, a second part between an outer surface of the first cylindrical metallic member and the inorganic mat member, and a third part between an inner surface of the second cylindrical metallic member and the inorganic mat member.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
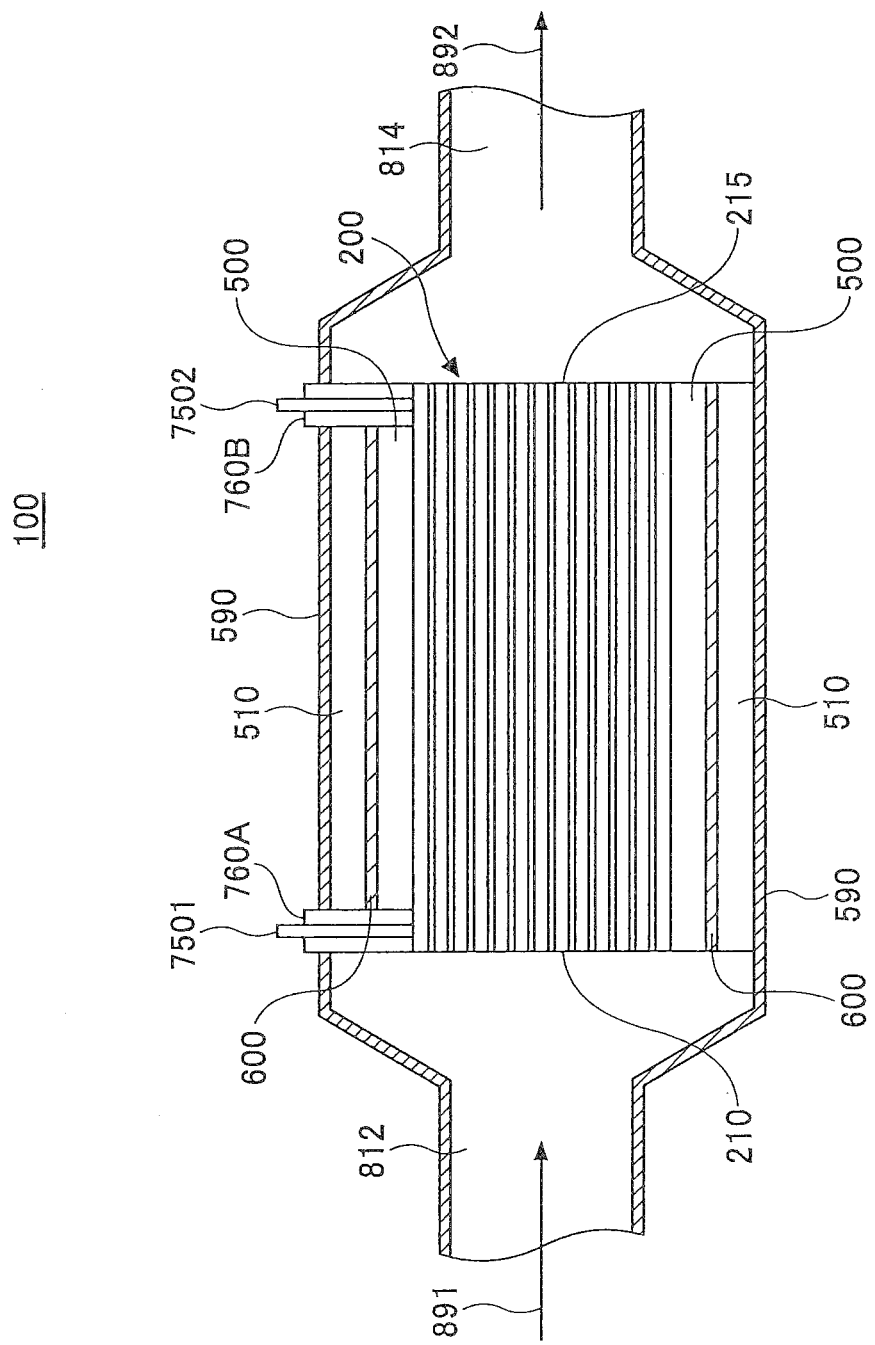
FIG. 1 is a cross-sectional view of an exhaust gas processing device of an embodiment of the present invention.

This conventional honeycomb structure described in Japanese Laid-open Utility Model Publication No. 49-124412 is heated due to its resistance (resistance heating) after applying electricity to the honeycomb structure via the electrodes. If the exhaust gas processing device is formed by the honeycomb structure, a mat member is wound around the outer periphery of the honeycomb structure and the honeycomb structure with the mat member wound around the honeycomb structure is accommodated in a metallic cylindrical member.

The mat member has insulation properties with its electric resistance under a dry atmosphere at room temperature. However, if the mat member is impregnated with moisture under high humidity, it is assumed that the electric resistance is decreased and the electric conductivity is increased. Further, if the mat member is impregnated with moisture to increase the electric conductivity, the honeycomb structure and the metallic cylindrical member are electrically short-circuited and a current leaks to the metallic cylindrical member at a time of applying electricity to the honeycomb structure. If the electric current leaks to the metallic cylindrical member, the honeycomb structure is less apt to be sufficiently heated.

Embodiments of the present invention can provide an exhaust gas processing device which can prevent an electric current from leaking to a member other than the honeycomb structure when an electric current is applied to a honeycomb unit.

The embodiments will now be described with reference to the accompanying drawings, wherein like reference numerals designate corresponding or identical elements throughout the various drawings.

Figure 2:
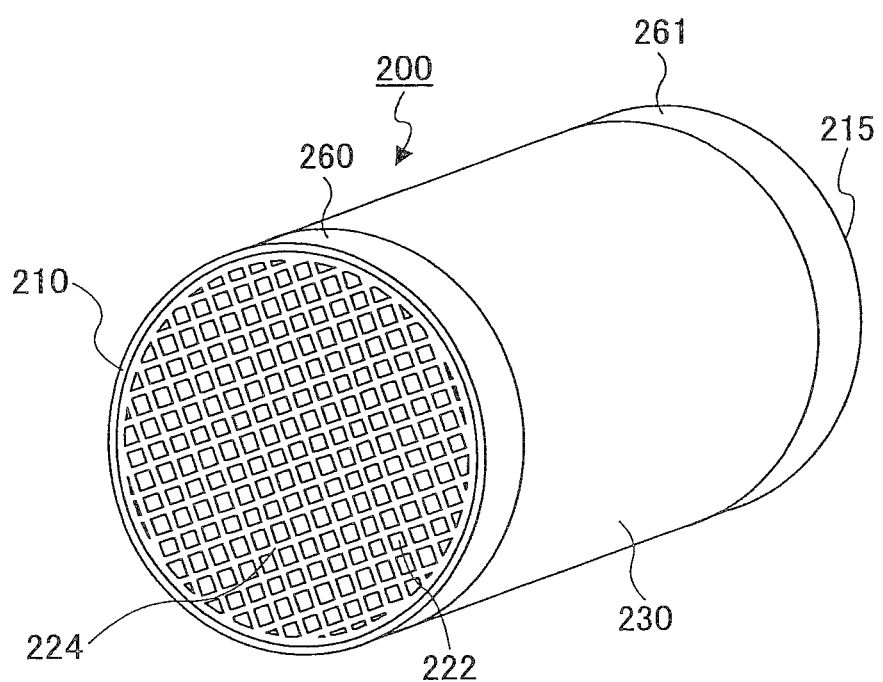
FIG. 2 is a perspective view schematically illustrating an example honeycomb structure included in the exhaust gas processing device of the embodiment of the present invention.

FIG. 1 schematically illustrates an example exhaust gas processing device of an embodiment of the present invention. FIG. 2 schematically illustrates a honeycomb structure forming an exhaust gas processing device of the embodiment of the present invention.

Referring to FIG. 1, the exhaust gas processing device 100 of the embodiment of the present invention includes a honeycomb structure 200, a first inorganic mat member 500 wound around an outer peripheral surface of the honeycomb structure 200, and a first cylindrical metallic member 600 accommodating the honeycomb structure having the first inorganic mat member 500 wound around the honeycomb structure.

The honeycomb structure 200 includes one honeycomb unit.

The first inorganic mat member 500 is wound around the outer peripheral surface of the honeycomb structure 200. When the exhaust gas processing device 100 is actually used in a vehicle or the like, the honeycomb structure 200 is in contact with the first cylindrical metallic member 600 to prevent the honeycomb structure 200 from breaking with a contact between the honeycomb structure 200 and the first cylindrical metallic member 600.

The first cylindrical metallic member 600 has a function of accommodating the honeycomb structure 200 around which the first inorganic mat member is wound.

The exhaust gas processing device 100 of the embodiment of the present invention further includes a second inorganic mat member 510 wound around an outer peripheral surface of the first cylindrical metallic member 600 and a second cylindrical metallic member 590 which accommodates the second inorganic member 510 wound around the first cylindrical metallic member 600. The exhaust gas processing device 100 has a double tube structure including the first cylindrical metallic member 600 and the second cylindrical metallic member 590. This double pipe structure of the exhaust gas processing device 100 is described below.

The first cylindrical metallic member 600 or the second cylindrical metallic member 590 is made of, for example, stainless steel, a nickel base alloy or the like.

Referring to FIG. 2 in detail, the honeycomb structure 200 has two end surfaces 210 and 215 which are opened. The honeycomb structure 200 includes plural cells (through holes) extending one end to the other end in its longitudinal direction and opened at both the end surfaces 210 and 215 and cell walls 224 for separating cells 222. The cell wall 224 includes a catalytic agent carrying layer made of γ-alumina. The catalytic agent carrying layer carries a noble metal catalytic agent of at least one of platinum and rhodium.

The honeycomb unit forming the honeycomb structure 200 is formed by a material whose main component is silicon carbide (SiC). In order to decrease the electric resistance of the honeycomb structure 200, a small amount of a resistance adjusting component such as aluminum nitride (AlN) may be added to the honeycomb structure 200. The honeycomb unit consisting the honeycomb structure 200 is conductive.

A set of electrodes 260 and 261 are located on the outer peripheral surface 230 of the honeycomb structure 200. In the example of the honeycomb structure 200 illustrated in FIG. 2, the electrode 260 surrounds one end portion of the outer peripheral surface 230 of the honeycomb structure 200, and the electrode 261 surrounds the other end portion of the outer peripheral surface 230 of the honeycomb structure 200. The one and other end portions of the outer peripheral surface 230 are in ranges of about 50 mm or less from the end surfaces of the honeycomb structure 200. However, this is an example and the shape and location of the electrodes 260 and 261 are not specifically limited.

The electrodes 260 and 261 are made of an electrically conductive material such as a metal. A method of forming the electrodes 260 and 261 is not specifically limited. The electrodes 260 and 261 may be formed on the outer peripheral surface 230 of the honeycomb structure 200 by thermal spraying metal, sputtering metal, vapor-deposition of metal or the like.

Referring to FIG. 1, the exhaust gas processing device 100 includes a pair of electric terminals 7501 and 7502. The electric terminal 7501 is connected to the electrode 260 provided in the honeycomb structure 200 by penetrating the first and second inorganic mat members 500 and 510. In a similar manner thereto, the electric terminal 7502 is connected to the electrode 261 provided in the honeycomb structure 200 by penetrating the first and second inorganic mat members 500 and 510. Said differently, the electric terminals 7501 and 7502 are electrically connected to the honeycomb structure 200 via the electrodes 260 and 261, respectively.

The electric terminal 7501 is insulated from the first and second cylindrical metallic members 600 and 590 by an insulator 760A. The electric terminal 7502 is insulated from the first and second cylindrical metallic members 600 and 590 by an insulator 760B.

Referring to the exhaust gas processing device 100 illustrated in FIG. 1, when exhaust gas flows from an inlet 812 to an outlet 814 in a direction of an arrow 891, the exhaust gas flows into the honeycomb structure 200 from the end surface 210 of the honeycomb structure 200.

Electric potentials are previously applied to the electrodes 260 and 261 via the electric terminals 7501 and 7502. The electric potential difference of the electrodes 260 and 261 are different. Therefore, the temperature of the honeycomb structure 200 is increased by resistance heating. Therefore, the exhaust gas flowing into the honeycomb structure 200 is treated while the catalytic agent existing in the cell walls of the honeycomb structure 200 is activated by heat generated by the resistance heating in the honeycomb structure 200. Even if the temperature of the exhaust gas is low like exhaust gas of a hybrid car, the activated catalytic agent properly treats the exhaust gas. Thereafter, the treated exhaust gas is exhausted from the end surface 215 of the honeycomb structure 200 in a direction illustrated by an arrow 892.

As described, the exhaust gas can be treated by making the exhaust gas flow inside the honeycomb structure 200 with the exhaust gas processing device 100.

In case of a conventional exhaust gas processing device having a single pipe structure as described in Japanese Laid-open Utility Model Publication No. 49-124412, a conductive honeycomb structure is insulated from a cylindrical metallic member by an inorganic mat interposed between the honeycomb structure and the cylindrical metallic member. If the inorganic mat member is thick, an effect of insulating the honeycomb structure from the cylindrical metallic member becomes high.

However, if the inorganic mat member of the conventional exhaust gas processing device having the single pipe structure is too thick such as about 30 mm, it is assumed that a retaining force of retaining the inorganic mat member in the honeycomb structure decreases. Therefore, it is assumed that the honeycomb structure is apt to shift from the predetermined position or is apt to drop from the inorganic mat member.

If the inorganic mat member becomes thin such as about 0.5 mm, it is assumed that the honeycomb structure and the metallic cylindrical member is apt to short-circuit to increase a probability of causing an electric current to leak to the metallic cylindrical member when the electric current is applied to the honeycomb structure. The mat member has insulation properties with its electric resistance low under a dry atmosphere at a room temperature (for example, about 25°). However, if the mat member is impregnated with moisture under high humidity, the electric resistance may be decreased and the electric conductivity may be increased. If the electric current leaks to the metallic cylindrical member, the honeycomb structure cannot be sufficiently heated.

With the embodiment of the present invention, the exhaust gas processing device 100 has the double pipe structure illustrated in FIG. 1. The first inorganic mat member 500 and the second inorganic mat member 510 exist between the honeycomb structure 200 and the second metallic cylindrical member 590. Therefore, if the thickness of the first inorganic mat member 500 is sufficient for generating the retaining force to the honeycomb structure 200, for example about 4 mm, the likelihood of the short-circuit between the honeycomb structure 200 and the second metallic cylindrical member 500 is apt to be reduced.

Further, in the exhaust gas processing device 100 of the embodiment of the present invention, at least one of the following three parts (i), (ii) and (iii) has an insulating layer 610A, 610B and 610C (not shown in FIG. 1), respectively: (i) first part of an inner surface of the first cylindrical metallic member 600 in contact with the first inorganic mat member 500; (ii) second part of the outer surface of the first cylindrical metallic member 600 in contact with the second inorganic mat member 510; and (iii) third part of an inner surface of the second cylindrical metallic member 590 in contact with the second inorganic mat member 510.

In the exhaust gas processing device 100 of the embodiment of the present invention, when an electric current is applied to the honeycomb unit included in the honeycomb structure 200, the temperature of the honeycomb structure 200 increases. By the inflow of the exhaust gas containing moisture, the first and second inorganic mat members 500 and 510 absorb the moisture. However, in the exhaust gas processing device 100 of the embodiment of the present invention, sufficient insulation between the honeycomb structure 200 and the second cylindrical metallic member 600 is provided by the above insulating layers 610A, 610B and 610C even if the insulation properties of the first and second inorganic mat members 500 and 510 are degraded by the moisture contained in the first and second inorganic mat members 500 and 510. In the exhaust gas processing device 100 of the embodiment of the present invention, when the insulating layer 610B is formed in the second part (ii), the resistance between the honeycomb structure 200 and the second cylindrical metallic member 600 measured when electricity is applied to the honeycomb structure 200 may be maintained to be, for example, about $1.0 \times 10^5 \Omega$ or more.

The resistance between the honeycomb structure and the second cylindrical metallic member is preferably about $1.0 \times 10^5 \Omega$ or more, more preferably about $9.0 \times 10^5 \Omega$ or more, further more preferably about $3.0 \times 10^8 \Omega$ or more.

Therefore, a current leakage inside the exhaust gas processing device 100 of the embodiment of the present invention is significantly restricted, and the honeycomb structure 200 can undertake appropriate resistance heating.

FIG. 3 to FIG. 9 schematically illustrate example modes of locating the insulating layers 610A, 610B and 610C in the exhaust gas processing device 100 of the embodiment of the present invention. FIG. 3 to FIG. 9 are cross-sectional views schematically illustrating the exhaust gas processing device 100 of the embodiment taken along a direction perpendicular to the longitudinal direction of the exhaust gas processing device 100.

Figure 3:
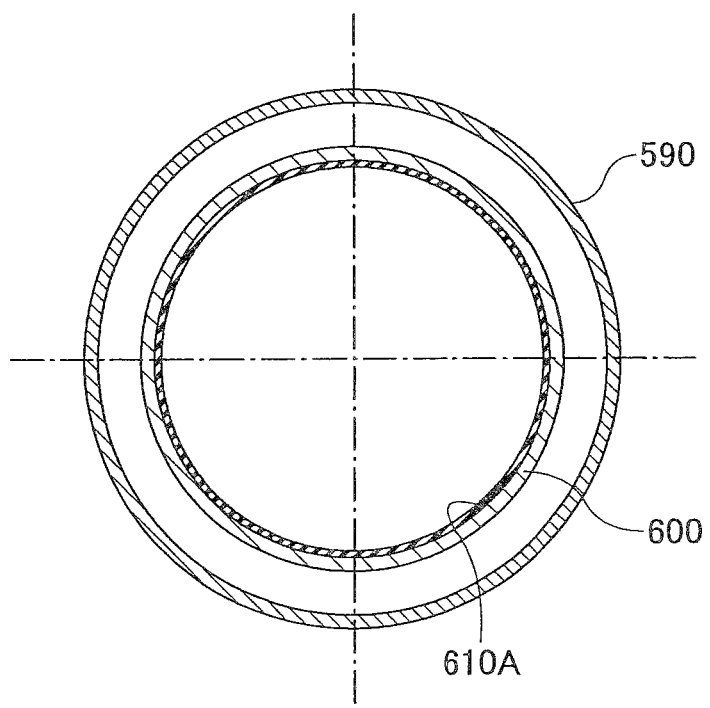
FIG. 3 is a cross-sectional view schematically illustrating example first and second cylindrical metallic members included in the exhaust gas processing device of the embodiment of the present invention.

Referring to FIG. 3, the insulating layer 610A is formed only at the first part of the inner surface of the first cylindrical metallic member 600 in contact with the first inorganic mat member 500.

Figure 4:
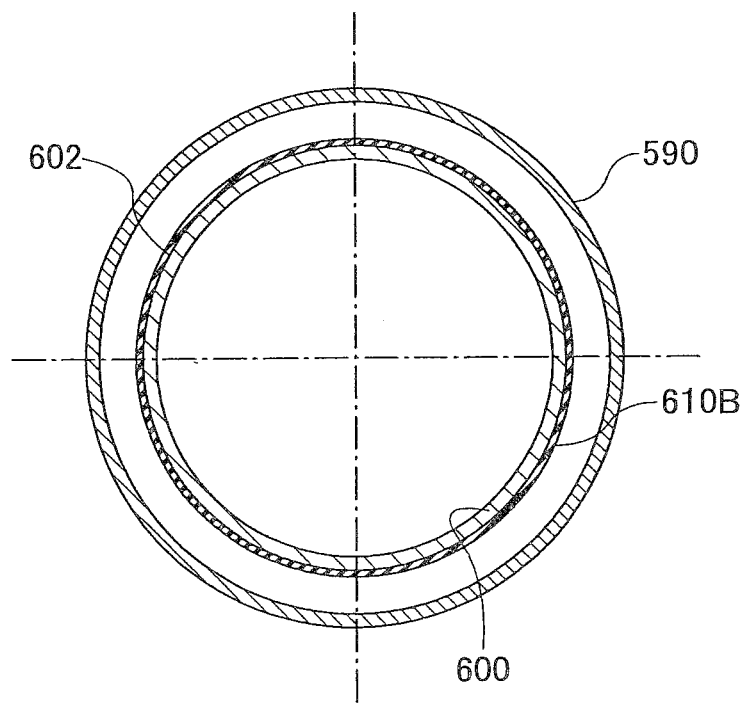
FIG. 4 is a cross-sectional view schematically illustrating other example first and second cylindrical metallic members included in the exhaust gas processing device of the embodiment of the present invention.

Referring to FIG. 4, the insulating layer 610B is formed only at the second part of the outer surface of the first cylindrical metallic member 600 in contact with the second inorganic mat member 510. With this structure, the insulating layer 610B can be relatively easily located.

Figure 5:
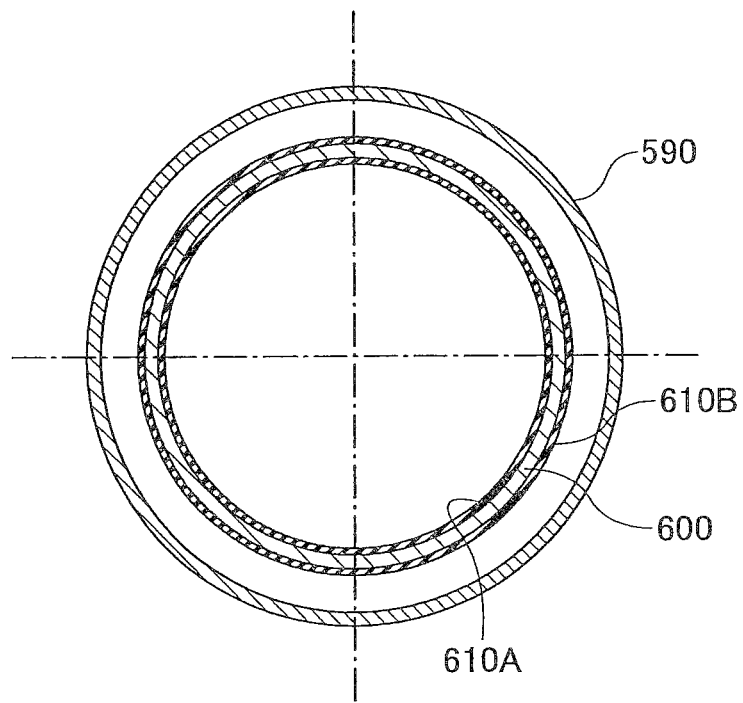
FIG. 5 is a cross-sectional view schematically illustrating other example first and second cylindrical metallic members included in the exhaust gas processing device of the embodiment of the present invention.

Referring to FIG. 5, the insulating layers 610A and 610B are formed at the first part of the inner surface of the first cylindrical metallic member 600 in contact with the first inorganic mat member 500 and the second part of the outer surface of the first cylindrical metallic member 600 in contact with the second inorganic mat member 510.

Figure 6:
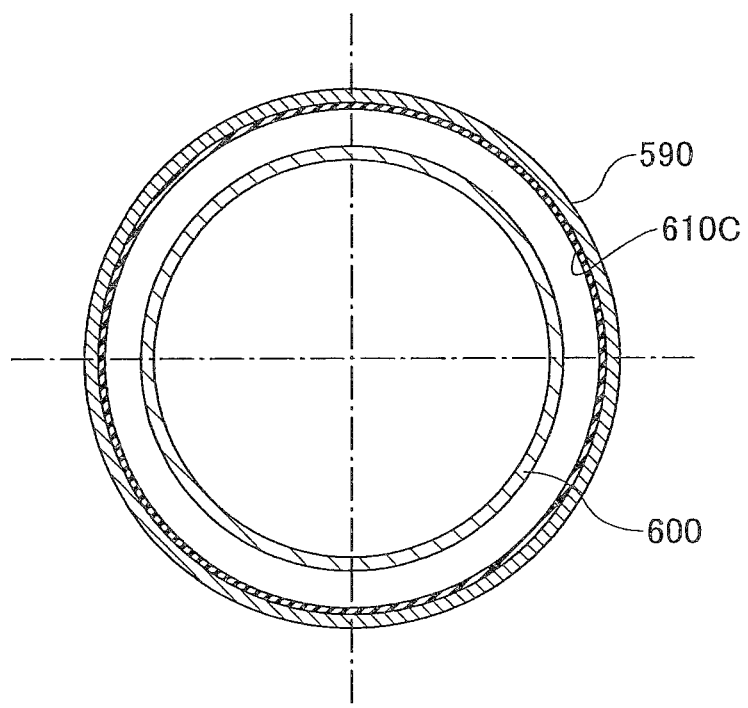
FIG. 6 is a cross-sectional view schematically illustrating other example first and second cylindrical metallic members included in the exhaust gas processing device of the embodiment of the present invention.

Referring to FIG. 6, the insulating layer 610C is formed only at the third part of the inner surface of the second cylindrical metallic member 590 in contact with the second inorganic mat member 510.

Figure 7:
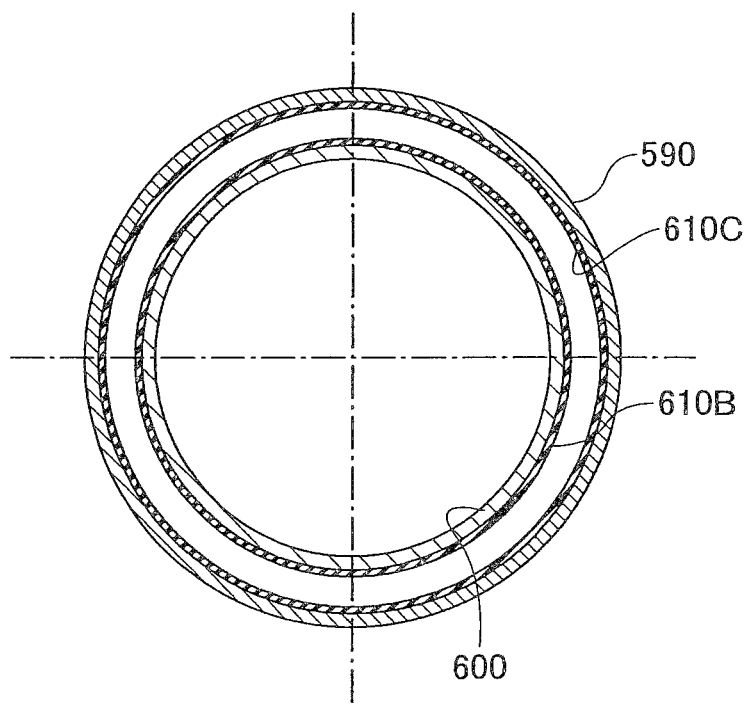
FIG. 7 is a cross-sectional view schematically illustrating other example first and second cylindrical metallic members included in the exhaust gas processing device of the embodiment of the present invention.

Referring to FIG. 7, the insulating layers 610B and 610C are formed at the second part of the outer surface of the first cylindrical metallic member 600 in contact with the second inorganic mat member 510 and the third part of the inner surface of the second cylindrical metallic member 590 in contact with the second inorganic mat member 510.

Figure 8:
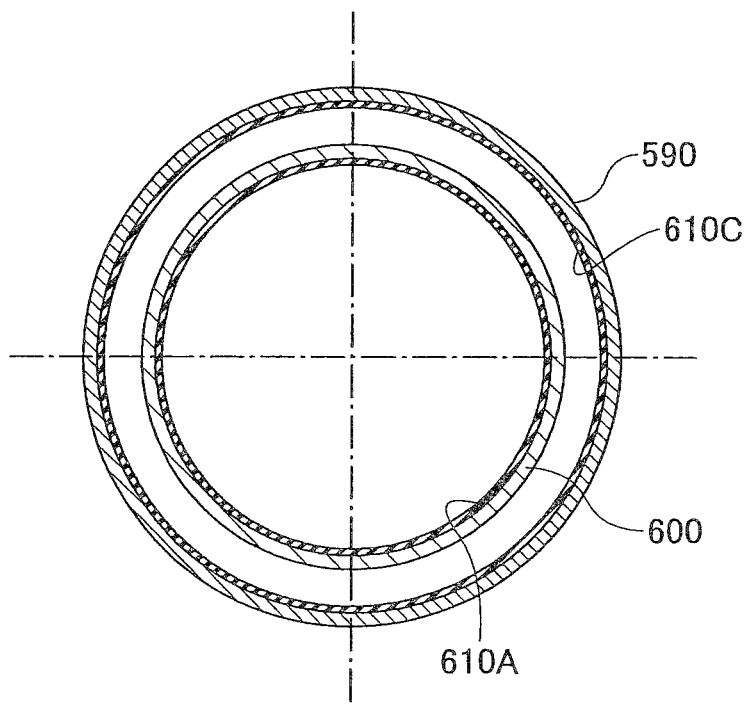
FIG. 8 is a cross-sectional view schematically illustrating other example first and second cylindrical metallic members included in the exhaust gas processing device of the embodiment of the present invention.

Referring to FIG. 8, the insulating layers 610A and 610C are formed at the first part of the inner surface of the first cylindrical metallic member 600 in contact with the first inorganic mat member 500 and the third part of the inner surface of the second cylindrical metallic member 590 in contact with the second inorganic mat member 510.

Figure 9:
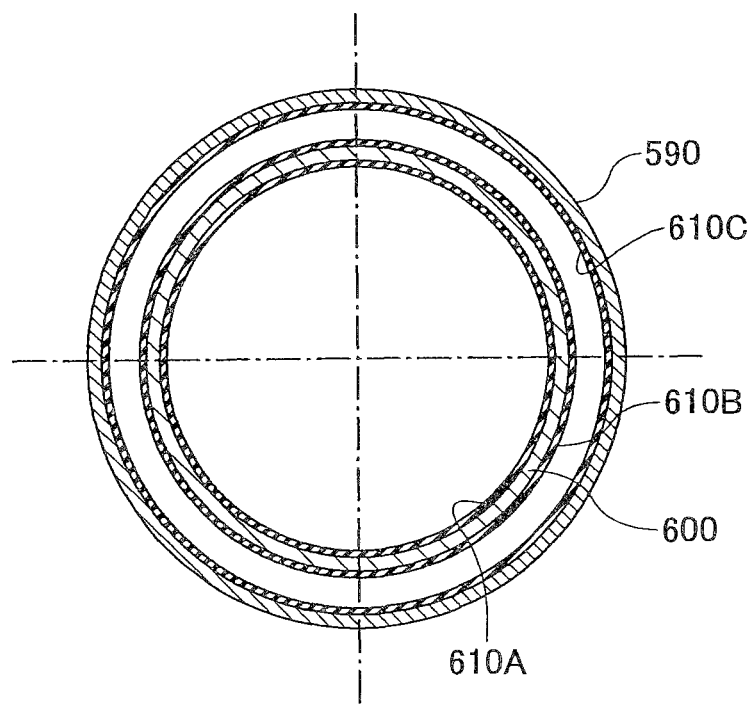
FIG. 9 is a cross-sectional view schematically illustrating other example first and second cylindrical metallic members included in the exhaust gas processing device of the embodiment of the present invention.

Referring to FIG. 9, the insulating layers 610A, 610B and 610C are formed at the first part, the second part and the third part, respectively.

Said differently, the insulating layer of the embodiment of the present invention may be formed at least at one of the first, second and third parts.

(Insulating Layer 610)

Detailed explanation of the insulating layers 610A, 610B and 610C (610A, 610B and 610C may be simply designated as 610), which may also be designated by a numerical reference 610, is given in reference to the figures. Although the insulating layer 610B formed at the second part is explained next, the explanation is applicable to the insulating layers 610A and 610C formed at the first and third parts in a similar manner.

Referring to the exhaust gas processing device of FIG. 4, the first cylindrical metallic member 600 has an outer surface 602, and the insulating layer 610B is densely formed on the outer surface 602 without generating a through pore in thickness directions of the insulating layer 610B.

The terminology of "dense" designates a state in which no through pore exists in the thickness direction of the insulating layer 610B. For example, the densely formed insulating layer 610B includes an insulating layer having no pores at all, an insulating layer having only closed pores, and an insulating layer having blind pores opened and clogged only on one side in a thickness direction of the insulating layer.

The through pore, the closed pore, and the blind pore are described in Characterization of Pore Structure of Filter Media (Fluid/Particle Separation Journal vol. 14, No. 3, p. 227 to 241). The entire contents of Characterization of Pore Structure of Filter Media (Fluid/Particle Separation Journal vol. 14, No. 3, p. 227 to 241) are incorporated herein by reference.

Figure 19:
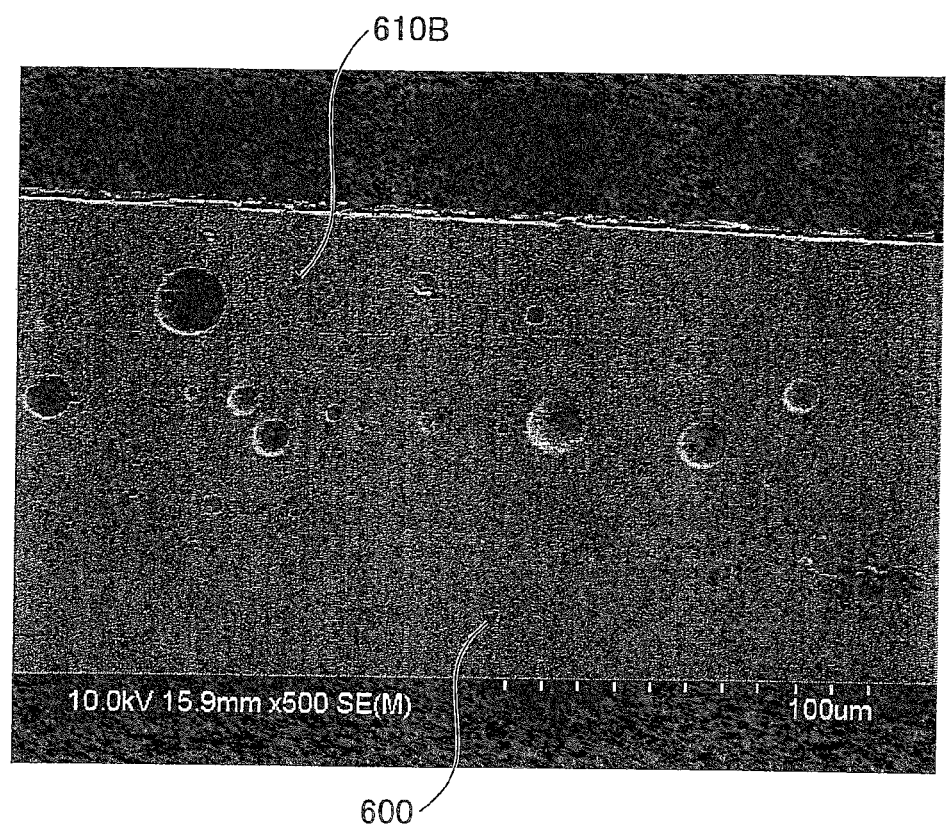
FIG. 19 is a scanning electron micrograph of an densely formed insulating layer of the embodiment of the present invention captured by a scanning electron microscope (SEM).

The method of confirming the densely formed insulating layer includes coating of Cu particles on an entire surface of the insulating layer 610B. A pair of the electrodes is installed on the surface of the insulating layer 610B and on the inner surface of the cylindrical metallic member 600. A voltage of 500 V is applied between the pair of the electrodes to measure a resistance between the surface of the insulating layer 610B and the inner surface of the cylindrical metallic member 600. The resistance is measured by a digital ultrahigh resistance/microammeter, type: R8340, manufactured by ADVANTEST CORPORATION. It is experimentally known if the resistance value between the surface of the insulating layer 610B and the inner surface of the cylindrical metallic member 600 is $4.0 \times 10^4 \Omega$ or less when the thickness of the insulating layer 610B is 20 μm or more, the through pores may exist, and if the resistance value between the surface of the insulating layer 610B and the inner surface of the cylindrical metallic member 600 is more than $4.0 \times 10^4 \Omega$ when the thickness of the insulating layer 610B is 20 μm or more, the through pores may not exist. Said differently, the insulating layer 610B is dense. FIG. 19 is a scanning electron micrograph of a densely formed insulating layer of the embodiment of the present invention captured by a scanning electron microscope (SEM). Referring to FIG. 19, an image of the densely formed insulating layer 610B having the thickness of 20 μm or more (400 μm) is magnified by 500 times using a scanning electron microscope (SEM) manufactured by Hitachi High-Technologies Corporation. The resistance of this densely formed insulating layer 610B is more than $4.0 \times 10^4 \Omega$. A resistance value between the surface of the insulating layer of the thickness of 20 μm or more in which the through pores exist and the outer surface of the cylindrical metallic member 600 was less than $4.0 \times 10^4 \Omega$.

Moisture may not intrude into the pores of the densely formed insulating layers. Even if the moisture intrudes into the pores, as long as the pores do not penetrate the insulating layer in its thickness direction, the moisture does not conduct electricity between the honeycomb structure 200 and the second cylindrical metallic member 590. Therefore, if the densely formed insulating layer 610B is formed on the outer surface of the first cylindrical metallic member 600, the cylindrical metallic member 590 is apt to be electrically insulated from the honeycomb structure 200.

It is preferable that the thickness of the insulating layer 610B is in a range of about 20 to about 400 μm.

If the thickness of the insulating layer 610B is about 20 μm or more, it becomes less apt to be difficult to secure the insulation property between the second cylindrical metallic member 590 and the honeycomb structure 200. Meanwhile, if the thickness of the insulating layer 610B is about 400 μm or less, a crack is less apt to be generated in the insulating layer 610B at times of manufacturing the insulating layer 610B or using the exhaust gas processing device 100. Then, it becomes less apt to be difficult to secure the insulation property.

The insulating layer 610B preferably has a glass layer. The glass layer may be any layer containing a component of glass such as quartz glass and alkali glass.

The reason why the glass layer becomes the densely formed insulating layer is that air inside the molten glass is apt to be extracted when the glass ingredient is melted in a process of forming the glass layer on the outer surface of the first cylindrical metallic member 600.

The glass ingredient contained in the glass layer may be barium glass, boron glass, strontium glass, alumina silicate glass, soda-zinc glass, soda-barium glass or the like, and more preferably, silicate glass containing barium. The glass ingredient contained in the glass layer may be one or a combination of the above-mentioned glasses.

The melting point of the glass layer is preferably about 400 to about 1000° C. If the melting point of the glass layer is about 400° C. or more, the glass layer is less apt to be softened during the exhaust gas processing device is used. Then, an effect of the insulation is less apt to be lost. On the other hand, if the melting point of the glass layer about 1000° C. or less, a heat treatment at a high temperature becomes unnecessary at a time of forming the glass layer in the first cylindrical metallic member 600. At this time, the first cylindrical metallic member 600 is less apt to be degraded.

It is preferable that the thickness of the glass layer is in a range of about 20 to about 400 μm. If the thickness of the glass layer is about 20 μm or more, it becomes less apt to be difficult to secure the insulation property between the first cylindrical metallic member 600 and the honeycomb structure 200.

Meanwhile, if the thickness of the glass layer is about 400 μm or less, a crack is less apt to be generated in the glass layer at times of manufacturing the glass layer or using the exhaust gas processing device 100. Then, it becomes less apt to be difficult to secure the insulation property.

Alternatively, the insulating layer 610B is preferably a mixed layer formed by an amorphous inorganic material (glass ingredient) and a crystalline metal oxide.

The amorphous inorganic material may be barium glass, boron glass, strontium glass, alumina silicate glass, soda-zinc glass, soda-barium glass or the like.

The crystalline metal oxide may be at least one of ferric oxide, cobalt oxide, copper oxide, manganese oxide, chrome oxide and aluminum oxide.

The reason why the mixed layer becomes the densely formed insulating layer is that air inside the amorphous inorganic material (glass ingredient) is extracted when the amorphous inorganic material (glass ingredient) is melted in a process of forming the glass layer on the outer surface 602 of the first cylindrical metallic member 600.

It is preferable that the thickness of the mixed layer is in a range of about 50 to about 400 μm. If the thickness of the mixed layer is about 50 μm or more, it becomes less apt to be difficult to secure the insulation property between the first cylindrical metallic member 600 and the honeycomb structure 200. Meanwhile, if the thickness of the mixed layer is 400 μm or less, a crack is less apt to be generated in the mixed layer at times of manufacturing the mixed layer or using the exhaust gas processing device 100. Then, it becomes less apt to be difficult to secure the insulation property.

Figure 10:
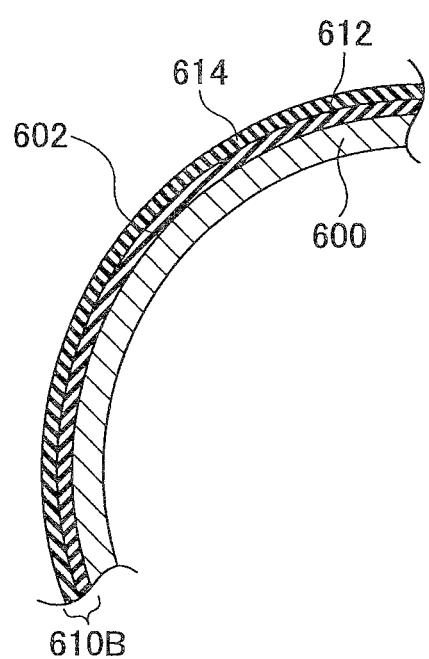
FIG. 10 is a schematic cross-sectional view of a part of the first cylindrical metallic member included in the exhaust gas processing device of the embodiment of the present invention.

FIG. 10 is a cross-sectional view of apart of other first cylindrical metallic member 600 included in the exhaust gas processing device 100 of the embodiment of the present invention. Referring to FIG. 10, other mode of the outer surface 602 of the first cylindrical metallic member 600 is illustrated.

In the example of the exhaust gas processing device 100 in FIG. 10, an insulating layer 610B installed outside the outer surface 602 of the first cylindrical metallic member 600 has a double layer structure. The insulating layer 610B includes a first layer 612 and a second layer 614 in an order from the circular center of the first cylindrical metallic member 600 to the outer periphery of the first cylindrical metallic member 600. The second layer 614 may be the above-mentioned glass layer. Referring to FIG. 10, the first layer 612 increases adhesion between the outer surface 602 of the first cylindrical metallic member 600 and the second layer 614. The first layer 612 may be the above-mentioned mixed layer.

For example, the first layer 612 preferably has a coefficient of thermal expansion between a coefficient of thermal expansion αA of the first cylindrical metallic member 600 and a coefficient of thermal expansion αB of the second cylindrical metallic member 614. For example, if the first cylindrical metallic member 600 is made of stainless steel (SUS304), the coefficient of thermal expansion αA of the first cylindrical metallic member 600 is about $17 \times 10^{-6}/°$ C. If the second cylindrical metallic member 614 is made of quartz glass, the coefficient of thermal expansion αB of the second cylindrical metallic member 614 is about $0.6 \times 10^{-6}/°$ C. In this case, if the range of the coefficient of thermal expansion αA of the first cylindrical metallic member 600 is determined to be from about $0.6 \times 10^{-6}/°$ C. to about $17 \times 10^{-6}/°$ C., it is possible to form the insulating layer 610B having good adhesion between the first layer 612 and the first cylindrical metallic member 600 of the exhaust gas processing device 100. This is because stress caused by a difference of thermal expansion between the first cylindrical metallic member 600 and the insulating layer 610B is apt to be relaxed.

When the insulating layer 610B has the double layer structure, the first layer 612 has a thickness of about 50 μm or more, the second layer 614 has a thickness of about 20 μm or more, or the first layer 612 has a thickness of about 50 μm or more and the second layer 614 has a thickness of about 20 μm or more. If the thickness of the first layer 612 is about 50 μm or more and the thickness of the second layer 614 is about 20 μm or less, it becomes less apt to be difficult to secure the insulation property between the first cylindrical metallic member 600 and the honeycomb structure 200. If the insulating layer 610B has a double layer structure, the thickness of the insulating layer 610B is preferably about 400 μm or less. If the thickness of the insulating layer 610B having the double layer structure is about 40 μm or less, a crack may be less apt to be generated in the insulating layer 610B having the double layer structure at times of manufacturing the insulating layer 610B or using the exhaust gas processing device 100. Therefore, it becomes less apt to be difficult to secure the insulation property.

In the example of the exhaust gas processing device 100 illustrated in FIG. 10, the insulating layer 610B has the double layer structure. However, the number of the layers forming the insulating layer 610B is not limited to two (double). For example, the insulating layer 610B may be a triple layer structure, a quad layer structure or the like.

(Other Components Forming the Exhaust Gas Processing Device)

The other components forming the exhaust gas processing device 100 of the embodiment of the present invention are described in detail.

(Honeycomb Structure)

Referring to FIG. 2, the honeycomb structure 200 has a cylindrical shape. However, the shape of the honeycomb structure 200 is not specifically limited. The shape of the honeycomb structure 200 may be substantially cylindroid, substantially square-pillared, substantially polygonal pillared or the like.

In the example of the exhaust gas processing device 100 illustrated in FIG. 2, the honeycomb structure 200 has a so-called integral structure in which a single honeycomb unit is included. However, the honeycomb structure may have a so-called separable structure in which plural honeycomb units are included.

Figure 11:
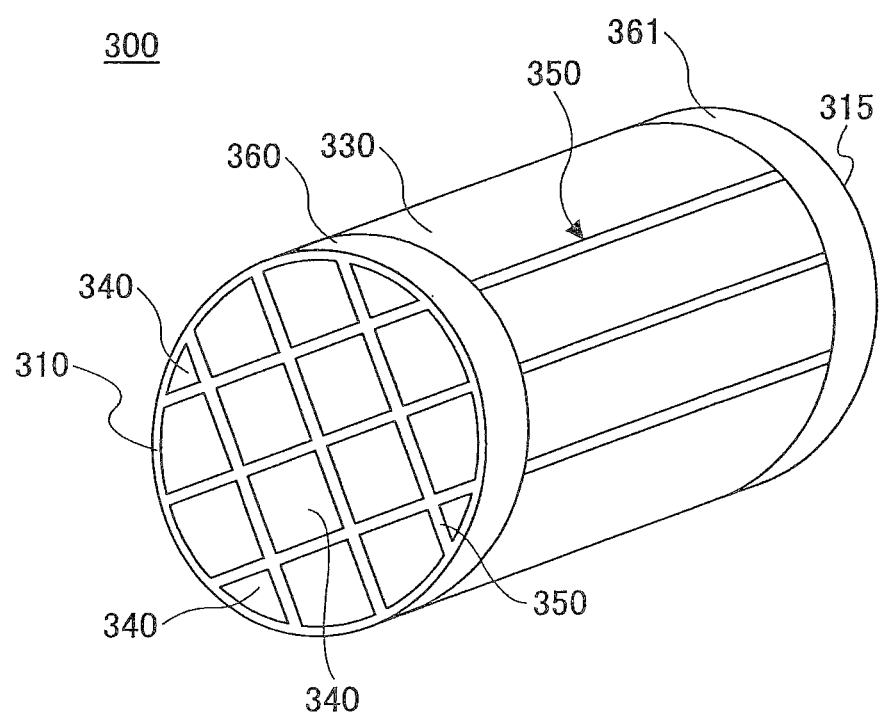
FIG. 11 is a perspective view schematically illustrating another example honeycomb structure included in the exhaust gas processing device of the embodiment of the present invention.
Figure 12:
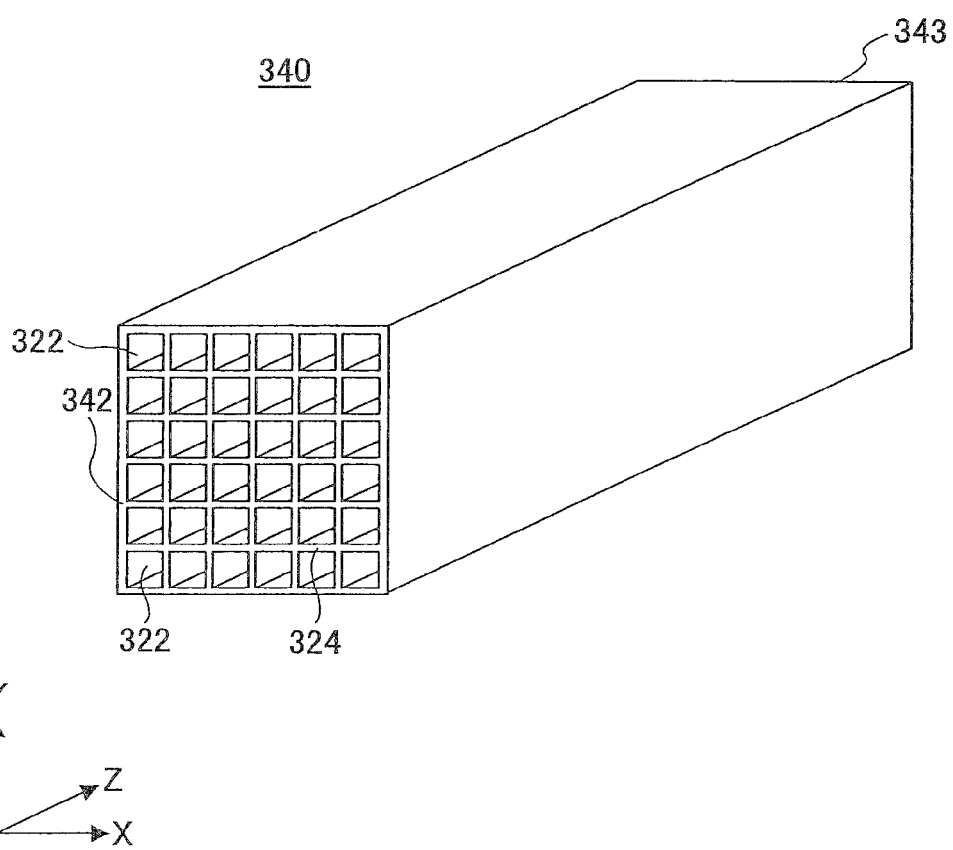
FIG. 12 schematically illustrates an example honeycomb unit forming the honeycomb structure illustrated in FIG. 11.

FIG. 11 is a perspective view schematically illustrating other example honeycomb structure included in the exhaust gas processing device of the embodiment of the present invention. FIG. 12 schematically illustrates an example honeycomb unit forming the honeycomb structure 300 illustrated in FIG. 11.

Referring to FIG. 11, the honeycomb structure 300 has the separable structure.

The honeycomb structure 300 includes two opened end surfaces 310 and 315 and an outer peripheral surface 330. The honeycomb structure 300 is formed by connecting plural honeycomb units 340 by interposing adhesive layers 350. The honeycomb structure 300 illustrated in FIG. 11 includes four substantially rectangular pillars vertically and horizontally arranged. After vertically and horizontally arranging and joining the four by four (sixteen) substantially rectangular pillars by interposing the adhesive layer 350, the periphery of the outer peripheral surface 330 is processes in a substantially circular shape in a cross-sectional view perpendicular to the longitudinal direction.

Referring to FIG. 12, the honeycomb units 340 extend from an end surface 342 to another end surface 343 along a longitudinal direction of the honeycomb units 340. The honeycomb units 340 may be made of a material whose main component is, for example, silicon carbide (SiC). In order to decrease electric resistance, a small amount of an electric resistance adjusting element such as aluminum nitride (AlN) is added to the honeycomb units 340. The cell walls 324 of the honeycomb unit 340 include a catalytic agent carrying layer made of γ-alumina. The catalytic agent carrying layer carries a noble metal catalytic agent of at least one of platinum and rhodium.

In the honeycomb structure 300 illustrated in FIG. 11, in a manner similar to the honeycomb structure 200 illustrated in FIG. 2, a pair of electrodes 360 and 361 is located at any portions of the outer peripheral surface 330. For example, the electrodes 360 and 361 are located in the vicinity of the end surfaces of the outer peripheral surface 330 in FIG. 11. The honeycomb structure 300 undertakes resistance heating when electricity is applied to both of the electrodes 360 and 361.

Figure 13:
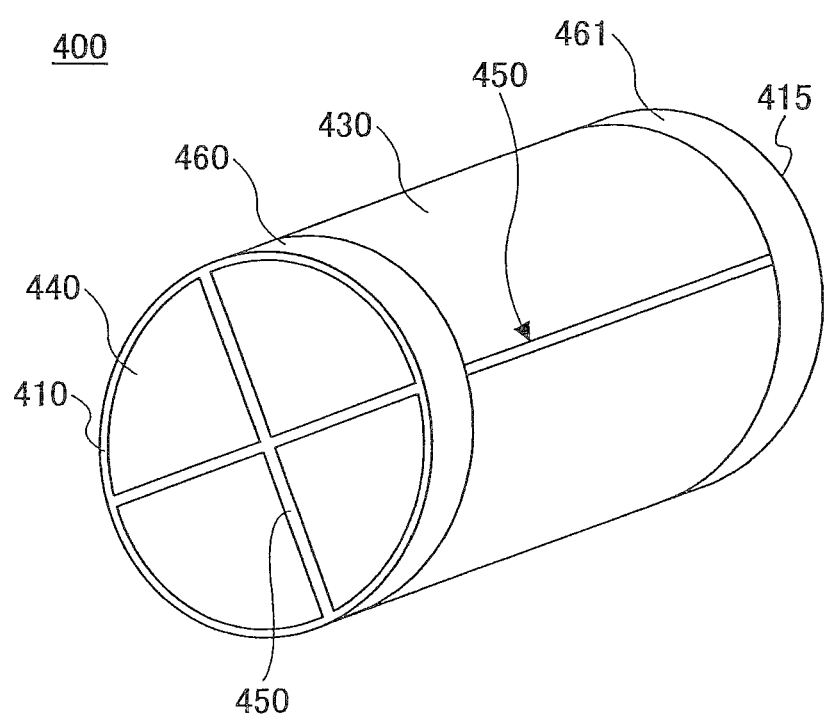
FIG. 13 is a perspective view schematically illustrating another example honeycomb structure included in the exhaust gas processing device of the embodiment of the present invention.
Figure 14:
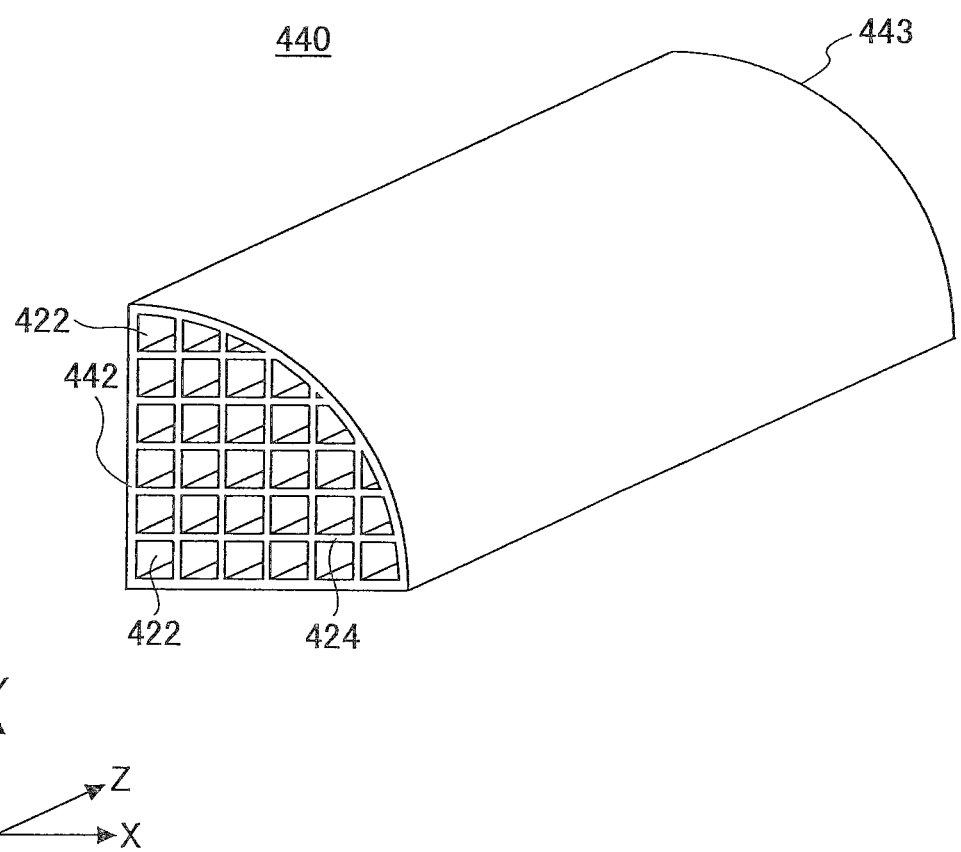
FIG. 14 schematically illustrates an example honeycomb unit forming the honeycomb structure illustrated in FIG. 13.

FIG. 13 illustrates a honeycomb structure 400 having other separable structure. FIG. 14 schematically illustrates an example honeycomb unit forming the honeycomb structure 400 illustrated in FIG. 13.

The honeycomb structure 400 includes two opened end surfaces 410 and 415 and an outer peripheral surface 430.

The honeycomb structure 400 is formed by connecting plural honeycomb units 440 by interposing adhesive layers 450. For example, in the honeycomb structure illustrated in FIG. 13, the honeycomb structure 400 is formed by four honeycomb units 440. The four honeycomb units 440 shaped in a substantially fan-like pillar are arranged so that the outer peripheral flat surfaces of the four honeycomb units face each other and joined each other by interposing the adhesive layer 450. The above substantially fan-like pillar shape has a cross-sectional view perpendicular to the longitudinal direction of the honeycomb unit defined by only two straight lines having substantially the same lengths and one substantially circular arc connected to the two straight lines. The shape and number of the honeycomb units are not limited to the above and any shape and any number can be employed.

Referring to FIG. 14, the honeycomb units 440 include plural cells 422 opened at both end surfaces 442 and 443 and cell walls 424 separating the cells 422. The honeycomb units 440 may be made of a material whose main component is, for example, silicon carbide (SiC). In order to decrease an electric resistance, a small amount of an electric resistance adjusting element such as aluminum nitride (AlN) is added to the honeycomb units 440. The cell walls 424 of the honeycomb unit 440 include a catalytic agent carrying layer made of γ-alumina. The catalytic agent carrying layer carries a noble metal catalytic agent of at least one of platinum and rhodium.

In the honeycomb structure 400 illustrated in FIG. 13, in a manner similar to the honeycomb structures 200 and 300 illustrated in FIG. 2 and FIG. 11, a pair of electrodes 460 and 461 is located at any portions of the outer peripheral surface 430. For example, the pair of the electrodes 460 and 461 are located in the vicinity of the end surfaces of the outer peripheral surface 430 in FIG. 13. The honeycomb structure 400 undertakes resistance heating when electricity is applied to the both of the electrodes 460 and 461.

Various members included in the honeycomb structures 300 and 400 having the separable structure are described.

(Honeycomb Unit)

The honeycomb units 340 and 440 may be made of a material of which main component is, for example, silicon carbide (SiC). In order to decrease an electric resistance, a small amount of an electric resistance adjusting element such as aluminum nitride (AlN) is added to the honeycomb units 340 and 440.

The cross-sectional shape of the honeycomb units 340 and 440 perpendicular to the longitudinal direction of the honeycomb units 340 and 440 are not specifically limited and may be any shape. The cross-sectional shapes of the honeycomb units 340 and 440 may be substantially square, substantially rectanglar, substantially hexagon or the like.

The cross-sectional shapes of the cells 322 of the honeycomb unit 340 and the cells 422 of the honeycomb unit 440 perpendicular to the longitudinal direction of the cells 322 and 422 are not specifically limited and may further be substantially triangle, substantially polygonal or the like.

The cell density of the honeycomb units 340 and 440 is preferably in a range of about 15.5 to about 186 pieces/cm$^2$ (about 100 to about 1200 cpsi), more preferably in a range of about 46.5 to about 170 pieces/cm$^2$ (about 150 to about 800 cpsi) and further more preferably in a range of about 62 to about 155 pieces/cm$^2$ (about 150 to about 400 cpsi).

The porosities of the honeycomb units 340 and 440 are about 35 to about 70%.

The thicknesses of the cell walls 324 of the honeycomb unit 340 and the thicknesses of the cell walls 424 of the honeycomb unit 440 are not specifically limited. However, a preferable lower limit is about 0.1 mm in consideration of the strength, and a preferable upper limit is about 0.4 mm in consideration of a conversion capability.

The catalytic agents carried by the cell walls 324 of the honeycomb unit 340 and the cell walls 424 of the honeycomb unit 440 are not specifically limited and may be platinum, rhodium, palladium or the like. The catalytic agents may be carried by the cell walls 324 and 424 interposing alumina layers between the catalytic agents and the cell walls 324 and 424.

(Adhesive Layer)

The adhesive layers 350 and 450 of the honeycomb structures 300 and 400 use a paste for the adhesive layer as a raw material in forming the adhesive layers 350 and 450. The paste for the adhesive layer may be inorganic particles and an inorganic binder and may include at least one of an inorganic fiber and an organic binder, when necessary.

The inorganic particles for the paste for the adhesive layer are preferably silicon carbide (SiC). The inorganic binder may be inorganic sol, clay binder or the like. The inorganic sol may be alumina sol, silica sol, titania sol, water glass or the like. The clay binder may be white clay, kaolin (porcelain clay), montmorillonite, sepiolite, attapulgite or the like. These clay binders may be used alone or used in combination.

The inorganic binder is preferably alumina sol, silica sol, titania sol, water glass, sepiolite, attapulgite or the like.

The material of the inorganic fiber is preferably alumina, silica, silicon carbide, silica alumina, glass, potassium titanate, aluminum borate or the like. The materials of the inorganic fiber may be used alone or used in combination. The material of the inorganic fiber is more preferably silica alumina.

The organic binder is not specifically limited and may be one or more of polyvinyl alcohol, methyl cellulose, ethyl cellulose, carboxymethyl cellulose and the like. The organic binder is preferably carboxymethyl cellulose.

The thickness of the adhesive layer is preferably in a range of about 0.3 to about 2 mm. If the thickness of the adhesive layer is about 0.3 mm or more, sufficient adhesion strength between the adhesive layer and the honeycomb unit is apt to be obtainable. On the other hand, if the thickness of the adhesive layer is 2 mm or less, the pressure loss of the honeycomb structures 300 and 400 is less apt to increase. The number of the joined honeycomb units is appropriately selected in conformity with the size of the honeycomb structures 300 and 400.

(Inorganic Mat Member 500,510)

The first and second inorganic mat members 500 and 510 may be a mat material having any composition as long as the inorganic fiber are contained.

The inorganic mat members 500 and 510 may contain inorganic fibers of an average diameter of about 3 μm to about 8 μm made of alumina and silica. The inorganic mat member 500 may contain an organic binder.

The thicknesses of the first and second inorganic mat members 500 and 510 are preferably in a range of about 1 to about 20 mm where the first and second inorganic mat members 500 and 510 are accommodated in the first and second cylindrical metallic members 600 and 590.

If the thickness of the first inorganic mat member 500 is about 1 mm or more, a buffer effect between the honeycomb structures 200, 300 and 400 and the first cylindrical metallic member 600 becomes less apt to be insufficient when the honeycomb structures 200, 300 and 400 and the first cylindrical metallic member 600 are actually installed in a vehicle or the like. Thus, the honeycomb structures 200, 300 and 400 are less apt to be broken. If the thickness of the second inorganic mat member 510 is about 1 mm or more, a buffer effect between the first cylindrical metallic member 600 and the second cylindrical metallic member 590 becomes less apt to be insufficient when the first cylindrical metallic member 600 and the second cylindrical metallic member 590 are actually installed in a vehicle or the like. Thus, the first cylindrical metallic member 600 and the second cylindrical metallic member 590 are less apt to be broken.

Meanwhile, if the thickness of the first inorganic mat member 500 is about 20 mm or less, a retaining force of the honeycomb structures 200, 300 and 400 is apt to decrease when the honeycomb structures 200, 300 and 400 are actually installed in a vehicle or the like. Thus, a positional relationship between the honeycomb structures 200, 300 and 400 and the first cylindrical metallic member 600 is less apt to change or the honeycomb structures 200, 300 and 400 are less apt to drop off the first cylindrical metallic member 600. Meanwhile, if the thickness of the second inorganic mat member 510 is about 20 mm or less, a retaining force of the first cylindrical metallic member 600 is less apt to decrease.

The densities of the first and second inorganic mat members 500 and 510 are preferably in a range of about 0.05 to about 0.5 g/cm$^3$ where the first and second inorganic mat members 500 and 510 are accommodated in the first and second cylindrical metallic members 600 and 590. If the density of the first inorganic mat member 500 is about 0.05 g/cm$^3$ or more, a buffer effect between the honeycomb structures 200, 300 and 400 and the first cylindrical metallic member 600 becomes less apt to be insufficient when the honeycomb structures 200, 300 and 400 and the first cylindrical metallic member 600 are actually installed in a vehicle or the like. Thus, the honeycomb structures 200, 300 and 400 are less apt to be broken. If the density of the second inorganic mat member 510 is about 0.05 g/cm$^3$ or more, a buffer effect between the first cylindrical metallic member 600 and the second cylindrical metallic member 590 becomes less apt to be insufficient when the first cylindrical metallic member 600 and the second cylindrical metallic member 590 are actually installed in a vehicle or the like. Thus, the first cylindrical metallic member 600 and the second cylindrical metallic member 590 are less apt to be broken. If the density of the first inorganic mat member 500 is about 0.5 g/cm$^3$ or less, a pressure received by the first inorganic member 500 from the first cylindrical metallic member 600 and the honeycomb structures 200, 300 and 400 becomes less apt to be great. Thus, the first inorganic mat member 500 is less apt to be crashed or broken. If the density of the second inorganic mat member 510 is about 0.5 g/cm$^3$ or less, pressures received by the second inorganic member 510 from the first and second cylindrical metallic members 600 and 590 become less apt to be great. Thus, the second inorganic mat member 510 is less apt to be crashed or broken.

(Manufacturing Method of the Exhaust Gas Processing Device)

Next, a manufacturing method of the exhaust gas processing device 100 of the embodiment of the present invention is described.

When the exhaust gas processing device 100 of the embodiment of the present invention is manufactured, the first inorganic mat member 500 is wound around the outer peripheral surfaces of the honeycomb structures 200, 300 and 400, and then the honeycomb structures 200, 300 and 400 having the first inorganic mat member 500 are accommodated in the cylindrical metallic member 600. When the exhaust gas processing device 100 of the embodiment of the present invention is manufactured, the second inorganic mat member 510 is wound around the outer peripheral surface of the first cylindrical metallic member 600, and then the first cylindrical metallic member 600 having the second inorganic mat member 510 is accommodated in the second cylindrical metallic member 590.

Hereinafter, an example manufacturing method of the honeycomb structure and an example forming method of the insulating layer on the cylindrical metallic member are described.

(Manufacturing Method of the Honeycomb Structure)

The honeycomb structure of the embodiment of the present invention is manufactured by the following method. A manufacturing method of the honeycomb structures 300 and 400 in the "separable structure" illustrated in FIG. 11 and FIG. 13 is described. The manufacturing method of the honeycomb unit is applicable to the manufacture of the honeycomb structure 200 of the integral structure except for adhesion of the plural honeycomb units with the adhesive layers.

The main component of a raw paste is silicon carbide (SiC). The raw paste undergoes extrusion molding to manufacture a honeycomb molded body. In order to adjust the electric resistance of the honeycomb unit, aluminum nitride (AlN) or the like of an appropriate amount may be added to the raw paste.

An organic binder, a dispersing medium or a molding auxiliary agent may be properly added to the raw paste in addition to the above mentioned additives. The organic binder is not specifically limited and may be one or a combination of methyl cellulose, carboxymethyl cellulose, hydroxyethyl cellulose, polyethylene glycol, phenol resin, epoxy resin and the like. The amount of the organic binder is about 1 to about 10 parts by weight relative to the inorganic particle, the inorganic binder and the inorganic fiber of 100 parts by weight in total.

The dispersing medium is not specifically limited and may be water, an organic solvent such as benzene, alcohol such as methanol, and the like. The molding auxiliary agent is not specifically limited and may be ethylene glycol, dextrin, fatty acid, fatty acid soap, polyalcohol and the like.

The raw paste is not specifically limited and preferably mixed and kneaded. The raw paste may be kneaded by a mixer or an attritor or sufficiently kneaded by a kneader or the like.

The method of shaping the raw paste is not specifically limited and is preferably extrusion molding to shape like honeycomb having cells.

It is preferable to dry the obtained honeycomb molded body. A drying apparatus is not specifically limited and may be a microwave drying apparatus, a hot air drying apparatus, a dielectric drying apparatus, a decompression drying apparatus, a vacuum drying apparatus, a freeze drying apparatus and the like. It is preferable to degrease the obtained dried honeycomb molded body. A condition for degreasing the shaped honeycomb is not specifically limited and is appropriately selectable depending on the kind and the amount of the organic substance. The condition is preferably about two hours at a degree of about 400° C. After degreasing the honeycomb molded body, the obtained degreased honeycomb molded body is fired. The firing condition is not specifically limited and is preferably fired for a time of about 3 hours at a temperature of about 2200° C. under a inert gas atmosphere such as argon.

After a paste for an adhesive layer is coated on side surfaces of the above fired honeycomb unit so as to have a uniform thickness, other honeycomb units are sequentially laminated interposing the paste for the adhesive layer between the other honeycomb units and the side surfaces of the honeycomb unit. The paste for the adhesive layer will be the adhesive layer. This process is repeated to manufacture the honeycomb unit having a predetermined size.

Next, the honeycomb structure is heated to dry, degrease and solidify the paste for the adhesive layer to form the adhesive layer and simultaneously the honeycomb units are fixed one another. The heating temperature of the honeycomb structure is preferably about 500 to about 800° C., more preferably about 600 to about 700° C. If the temperature of heating the honeycomb structure is less than about 500° C., condensation polymerization of the inorganic binder contained in the paste for the adhesive layer is less apt to be processed to easily lower the adhesion strength of the adhesive layer. When the honeycomb unit is actually used by installing it in a vehicle or the like, the honeycomb unit may be apt to shift from a predetermined position or drop off the vehicle. Meanwhile, if the temperature of heating the honeycomb unit exceeds a temperature of about 800° C., because the condensation polymerization of the inorganic binder contained in the paste for the adhesive layer is completed, an effect of further enhancing the strength of the honeycomb structure is not obtainable and the productivity becomes apt to be bad.

The time duration for heating the honeycomb structure is preferably about 2 hours.

A cell wall of the honeycomb unit includes a catalytic agent carrying layer made of γ-alumina. The catalytic agent carrying layer carries a noble metal catalytic agent of at least one of platinum and rhodium.

The electrodes are located on the outer peripheral surface of the honeycomb structure. The electrodes may be formed by thermal spraying a metal, sputtering a metal or the like as described above.

As described, the honeycomb structures 300 and 400 of the separable structure as illustrated in FIG. 11 and FIG. 13 can be manufactured.

(Forming Method of the Insulating Layer on the Cylindrical Metallic Member)

The forming method of the insulating layer on the cylindrical metallic member is described next. The forming method of the insulating layer 610B on the outer peripheral surface of the first cylindrical metallic member 600 as illustrated in FIG. 4 is exemplified. This forming method is applicable to a case where an insulating layer is formed on another portion of the exhaust gas processing device.

The insulating layer 610B of the first cylindrical metallic member 600 may be formed by following methods. The first cylindrical metallic member 600 is prepared. The first cylindrical metallic member 600 may be stainless steel (e.g., SUS304 and SUS430) or nickel base alloy.

The insulating layer 610B is formed on the outer surface 602 of the first cylindrical metallic member 600. As described, the insulating layer 610B may include a glass layer and the insulating layer 610B may include a mixed layer.

A forming method of the insulating layer 610B is not specifically limited and may be a spray coating method, a brush painting method or the like for providing a glass component.

The forming method is the same even if the insulating layer has two or more layers.

Coating and baking of the insulating layer may be repeated by several times to secure the density.

The formed insulating layer is fired to make the insulating layer be fixed to the outer surface of the first cylindrical metallic member. If the above mentioned glass layer or mixed layer is used as the insulating layer, the calcination temperature after forming the insulating layer is preferably in a range of about 400 to about 1000° C.

If the firing temperature after forming the insulating layer is about 400° C. or more, the material of the insulating layer 610B and the material of the first cylindrical metallic member 600 are apt to cause chemical bond at an interface between the insulating layer 610B and the first cylindrical metallic member 600. Therefore, a composite oxide of the materials of the insulating layer 610B and the first cylindrical metallic member 600 is apt to be produced to thereby hardly lower the adhesion between the insulating layer 610B and the first cylindrical metallic member 600. In this case, the insulating layer 610B is less apt to peel off the first cylindrical metallic member 600. On the other hand, if the firing temperature after forming the insulating layer is about 1000° C. or less, the first cylindrical metallic member 600 is less apt to be deformed because the temperature of more than 1000° C. is not applied to the first cylindrical metallic member 600.

The exhaust gas processing device 100 in FIG. 1 is exemplified as the example exhaust gas processing device of the embodiment of the present invention. The embodiment of the present invention is applicable to exhaust gas processing devices having other structures. Next, other structure of the exhaust gas processing device of the embodiment of the present invention is described.

Figure 15:
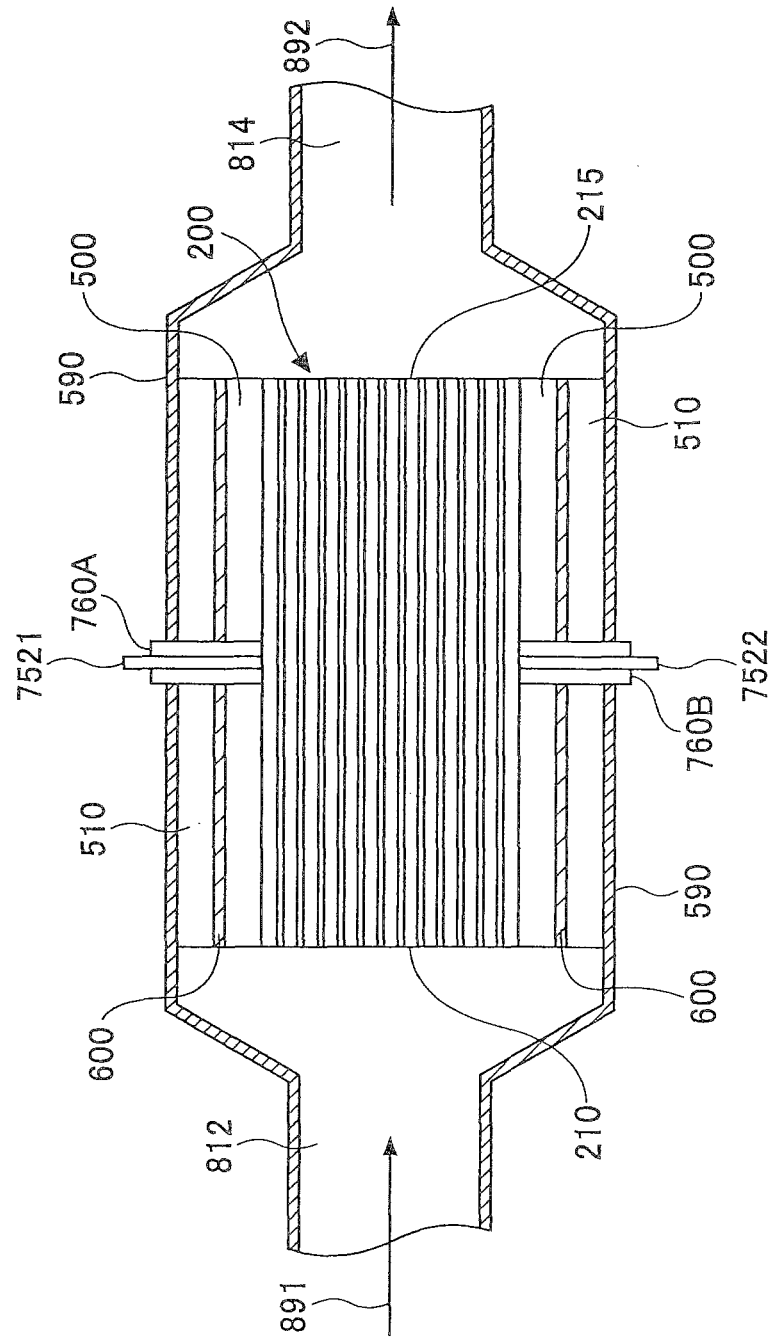
FIG. 15 is a cross-sectional view schematically illustrating an exhaust gas processing device of the embodiment of the present invention.
Figure 16:
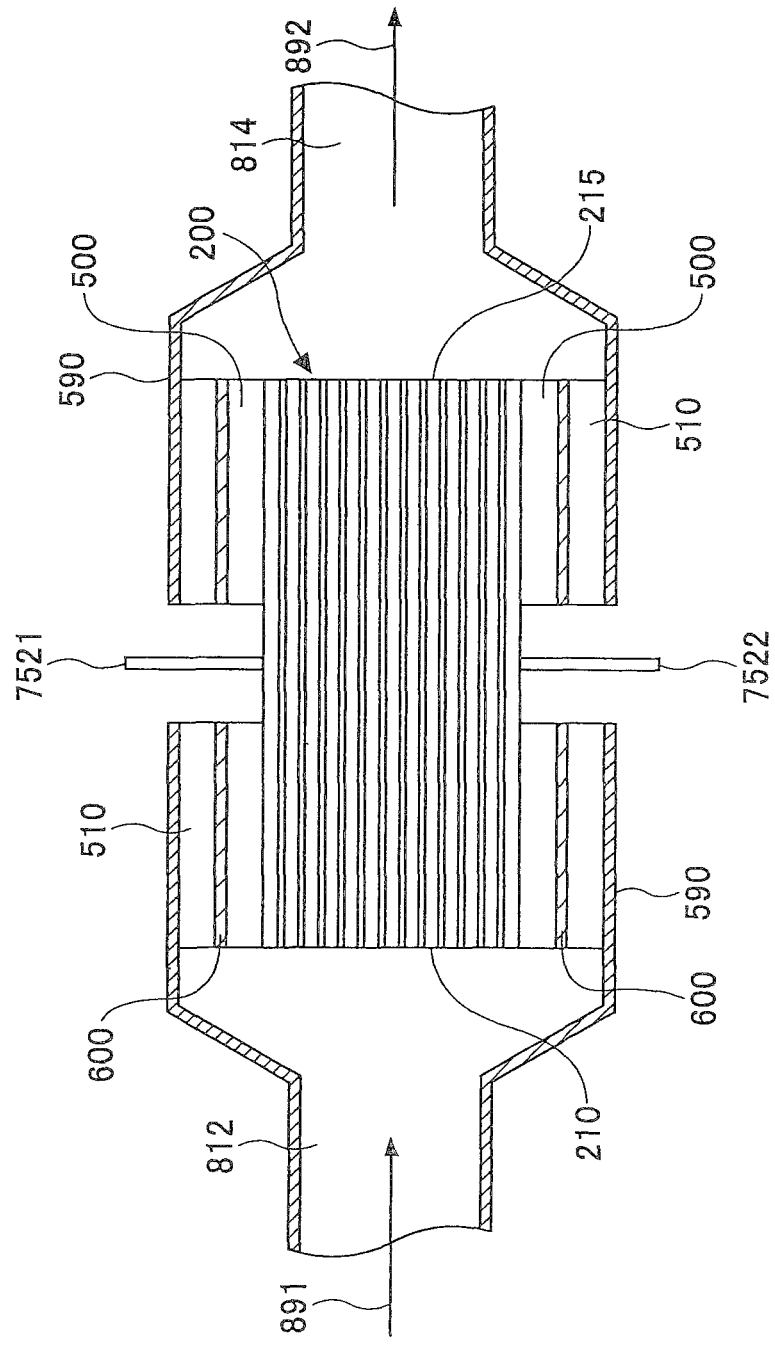
FIG. 16 is a cross-sectional view schematically illustrating other exhaust gas processing device of the embodiment of the present invention.
Figure 17:
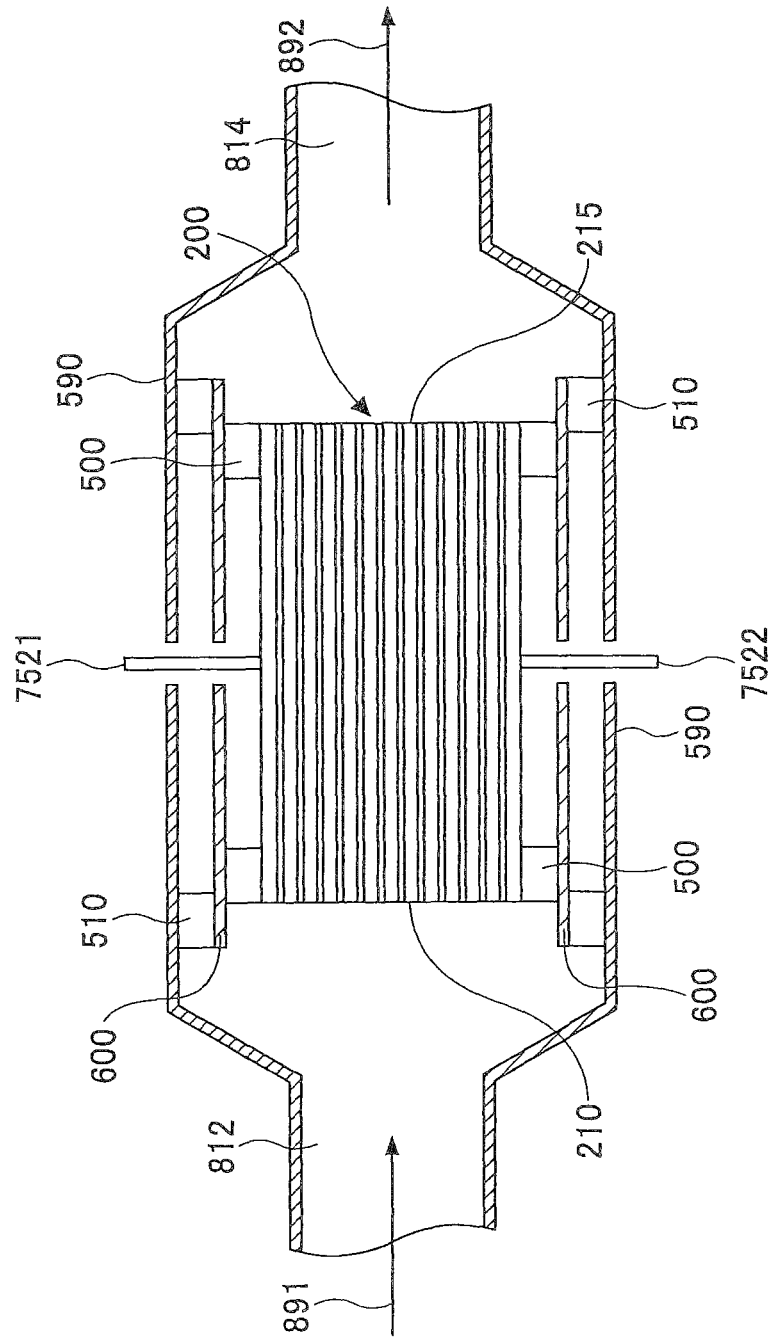
FIG. 17 is a cross-sectional view schematically illustrating other exhaust gas processing device of the embodiment of the present invention.

FIG. 15, FIG. 16 and FIG. 17 illustrate other structures of the exhaust gas processing device of the embodiment of the present invention.

Referring to FIG. 15, FIG. 16 and FIG. 17, the exhaust gas processing devices 101, 102 and 103 have a structure similar to that of the exhaust gas processing device 100 illustrated in FIG. 1. The same reference symbols as those in FIG. 1 are attached to FIG. 15, FIG. 16 and FIG. 17.

Referring to FIG. 15, the positions of electric terminals 7521 and 7522 are different from the positions of the electric terminals 7501 and 7502 illustrated in FIG. 1. In the exhaust gas processing device 101 illustrated in FIG. 15, the two electric terminals 7521 and 7522 are positioned at a center portion of the honeycomb structure 200 and not at both ends of the honeycomb structure 200. The electric terminals 7521 and 7522 extend in opposite directions perpendicular to the longitudinal direction of the honeycomb structure 200.

If the exhaust gas processing device 101 having the above structure is manufactured, the two electrodes of the honeycomb structure 200 are arranged in the vicinity of a center portion of the outer peripheral surface of the honeycomb structure 200 not like the end portions illustrated in FIG. 2 and FIG. 11.

In the exhaust gas processing device 102 illustrated in FIG. 16, two electric terminals 7521 and 7522 are not in contact with the first and second mat member 500 and 510. Thus, without providing insulators around the two electric terminals 7521 and 7522, insulation among the two electric terminals 7521 and 7522, the first and second cylindrical metallic members 600 and 590, and the first and second mat members 500 and 510 are secured.

Referring to FIG. 17, the positions of the first and second mat members 500 and 510 are different from the positions of the first and second mat members 500 and 510 illustrated in FIG. 17. Thus, as long as the honeycomb structure 200 is retained by the first inorganic mat member 500 and the first cylindrical metallic member 600 is retained by the second inorganic mat member 510, the positions where the first and second inorganic mat members are located are not limited. Various structures are applicable to the exhaust gas processing device of the embodiment.

EXAMPLES

Hereinafter, examples of the present invention are described.

Example 1

With the following method, a cylindrical metallic member having the insulating layer is manufactured. Further, an exhaust gas processing device including the cylindrical metallic member is manufactured.

(Manufacture of the Cylindrical Metallic Member)

The cylindrical metallic member was made of a steel pipe of SUS304 having an outer diameter of 105 mm, a wall thickness of 2 mm and a total length of 90 mm. Before the use, the steel pipe of SUS304 undergoes ultrasonic cleaning in alcohol.

The outer surface of the steel pipe of SUS304 undergoes sandblasting. In sandblasting, alumina abrasive grain of an abrasive number #80 was used and a treatment time was 10 minutes. The maximum height Rz of the outer surface of the steel pipe of SUS304 is 2.5 μm after sandblasting the steel pipe.

Next, the insulating layer was formed on the outer surface of the steel pipe of SUS304.

First, water of 100 parts by weight is added to silicate glass powder containing barium of 100 parts by weight. The water and silicate glass powder underwent wet blending using a ball mill to thereby prepare slurry.

This slurry was sprayed to coat the outer surface of the steel pipe of SUS304 and dried for 2 hours at a room temperature of 25° C. The steel pipe of SUS304 was heated at 900° C. for 20 minutes to thereby form a glass layer on the outer surface of the steel pipe of SUS304. The thickness of the glass layer was 30 μm.

The steel pipe of SUS304 is referred to as "a cylindrical metallic member of Example 1".

(Manufacture of the Exhaust Gas Processing Device)

The exhaust gas processing device was manufactured as follows.

Figure 18:
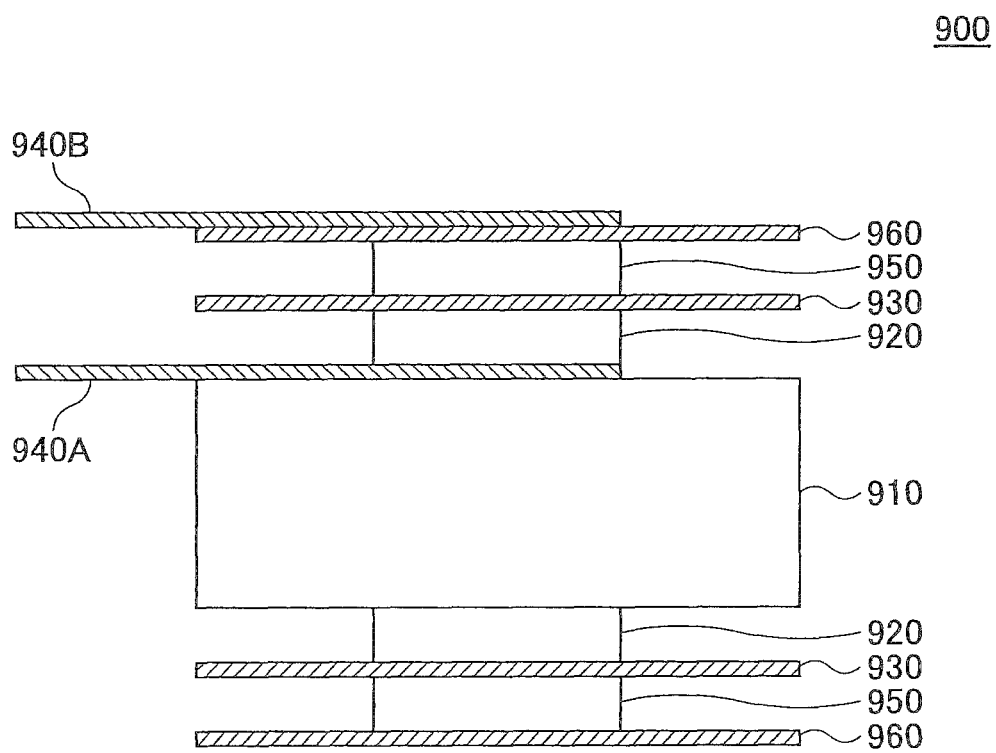
FIG. 18 is a cross-sectional view schematically illustrating the exhaust gas processing device of the example and the comparative example.

FIG. 18 schematically illustrates an exhaust gas processing device of according to Examples and Comparative Examples of the present invention. The exhaust gas processing device 900 includes a honeycomb structure 910, a first inorganic mat member 920, a cylindrical metallic member 930, a second inorganic mat member 950, a second cylindrical metallic member 960 and a pair of probe electrodes 940A and 940B for measurement.

The honeycomb structure 910 was a cylindrical honeycomb structure having an inner diameter of 93 mm and a total length of 100 mm as illustrated in FIG. 11. The honeycomb units forming the honeycomb structure 910 were made of silicon carbide.

The probe electrode for measurement 940A made of aluminum was attached to a side surface of the honeycomb structure 910. The probe electrode for measurement 940A has dimensions of a total length of 100 mm, a width of 10 mm and a thickness of 0.3 mm. The probe electrode for measurement 940A was fixed to the side surface of the honeycomb structure 910 using a commercially available insulating tape.

The inorganic mat member 920 was wound around the side surface of the honeycomb structure 910. The first inorganic mat member 920 was made of alumina fiber. The width of the first inorganic mat member 920 in the width direction of FIG. 18 was 30 mm.

Next, the honeycomb structure around which the first inorganic member was wound was press-fit into the cylindrical metallic member 930 of Example 1. The thickness of the first inorganic mat member 920 accommodated in the cylindrical metallic member 920 was 4 mm. The second inorganic mat member 950 was wound around the side surface of the cylindrical metallic member 930 of Example 1. The second inorganic mat member 950 was made of alumina fiber. The width of the second inorganic mat member 950 in the width direction of FIG. 18 was 30 mm.

An assembly in which the second mat member 950 was further assembled was press-fit into the second cylindrical metallic member 960. The second cylindrical metallic member 960 was made of a steel pipe of SUS304 having an outer diameter of 135 mm, a wall thickness of 2 mm and a total length of 90 mm. The thickness of the second inorganic mat member 960 accommodated in the second cylindrical metallic member 950 was 13 mm.

Another probe electrode for measurement 940B made of aluminum is located on the outer surface of the second cylindrical metallic member 960. The probe electrode for measurement 940B has dimensions of a total length of 100 mm, a width of 10 mm and a thickness of 0.3 mm. The probe electrode for measurement 940B is fixed to the outer surface of the second cylindrical metallic member 960 by a commercially available insulating tape.

The exhaust gas processing device 900 obtained as above is referred to as "an exhaust gas processing device of Example 1".

Example 2

In a similar manner to Example 1, a cylindrical metallic member of Example 2 and an exhaust gas processing device of Example 2 were manufactured. However, in Example 2, the thickness of a glass layer formed on the outer surface of the cylindrical metallic member of Example 2 is 20 μm. The other conditions are similar to those in Example 1.

Example 3

In a similar manner to Example 1, a cylindrical metallic member of Example 3 and an exhaust gas processing device of Example 3 were manufactured. However, in Example 3, the thickness of a glass layer formed on the outer surface of the cylindrical metallic member of Example 3 was 80 µm. The other conditions are similar to those in Example 1.

Example 4

In a similar manner to Example 1, a cylindrical metallic member of Example 4 and an exhaust gas processing device of Example 4 were manufactured. However, in Example 4, the thickness of a glass layer formed on the outer surface of the cylindrical metallic member of Example 4 was 400 µm. The other conditions are similar to those in Example 1.

Comparative Example 1

In a similar manner to Example 1, a cylindrical metallic member of Comparative Example 1 and an exhaust gas processing device of Comparative Example 1 were manufactured. However, in Comparative Example 1, the thickness of a glass layer formed on the outer surface of the cylindrical metallic member of Comparative Example 1 was 8 µm. The other conditions are similar to those in Example 1.

Comparative Example 2

In a similar manner to Example 1, a cylindrical metallic member of Comparative Example 2 and an exhaust gas processing device of Comparative Example 2 were manufactured. However, in Comparative Example 2, the thickness of a glass layer formed on the outer surface of the cylindrical metallic member of Comparative Example 2 was 600 µm. The other conditions are similar to those in Example 1.

Example 5

In a similar manner to Example 1, a cylindrical metallic member of Example 5 and an exhaust gas processing device of Example 5 were manufactured. However, in Example 5, an insulating layer is formed on the outer surface of an inner steel pipe of SUS304 (hereinafter, referred to as an inner pipe) as follows.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then the water and mixed powder underwent wet blending to thereby prepare slurry.

This slurry was sprayed to coat the outer surface of the inner steel pipe of SUS304 and dried for 2 hours at a room temperature of 25° C. Thereafter, the inner steel pipe was heated at 900° C. for 20 minutes to form a mixed layer of the crystalline metal oxide and the amorphous binder. The thickness of the mixed layer is 50 µm.

The inner steel pipe is referred to as a cylindrical metallic member of Example 5.

An exhaust gas processing device of Example 5 was manufactured in a similar manner to Example 1 using the cylindrical metallic member of Example 5.

Example 6

In a similar manner to Example 5, a cylindrical metallic member of Example 6 and an exhaust gas processing device of Example 6 were manufactured. However, in Example 6, the thickness of a glass layer formed on the outer surface of the cylindrical metallic member of Example 6 was 100 µm. The other conditions are similar to those in Example 5.

Example 7

In a similar manner to Example 5, a cylindrical metallic member of Example 7 and an exhaust gas processing device of Example 7 were manufactured. However, in Example 7, the thickness of a glass layer formed on the outer surface of the cylindrical metallic member of Example 7 was 400 µm. The other conditions are similar to those in Example 5.

Example 8

In a similar manner to Example 1, a cylindrical metallic member of Example 8 and an exhaust gas processing device of Example 8 were manufactured. However, in Example 8, an insulating layer is formed on an outer surface of an inner pipe.

Aluminum oxide powder ($Al_2O_3$) and silicate glass powder containing barium underwent dry blending in a weight ratio of $Al_2O_3$:silicate glass powder of 10:90 to obtain mixed powder. Water of 100 parts by weight is added to the mixed powder of 100 parts by weight. Then, the water and mixed powder underwent wet blending to thereby prepare slurry.

This slurry was sprayed to coat the outer surface of the inner pipe and dried for 2 hours at a room temperature of 25° C. Thereafter, the inner pipe was heated at 900° C. for 20 minutes to form a mixed layer of the crystalline metal oxide and the amorphous binder. The thickness of the mixed layer was 100 µm.

The inner steel pipe is referred to as a cylindrical metallic member of Example 8.

An exhaust gas processing device of Example 8 is manufactured in a similar manner to Example 1 using the cylindrical metallic member of Example 8.

Example 9

In a similar manner to Example 1, a cylindrical metallic member of Example 9 and an exhaust gas processing device of Example 9 were manufactured. However, in Example 9, an insulating layer is formed on an outer surface of an inner pipe.

Manganese oxide powder ($MnO_2$) and silicate glass powder containing barium underwent dry blending in a weight ratio of $MnO_2$:silicate glass powder of 15:85 to obtain mixed powder. Water of 100 parts by weight is added to the mixed powder of 100 parts by weight. Then, the water and mixed powder underwent wet blending to thereby prepare slurry.

This slurry was sprayed to coat the outer surface of the inner pipe and dried for 2 hours at a room temperature of 25° C. Thereafter, the inner pipe was heated at 900° C. for 20 minutes to form a mixed layer of the crystalline metal oxide and the amorphous binder. The thickness of the mixed layer was 100 µm.

The inner pipe is referred to as a cylindrical metallic member of Example 9.

An exhaust gas processing device of Example 9 was manufactured in a similar manner to Example 1 using the cylindrical metallic member of Example 9.

Comparative Example 3

In a similar manner to Example 5, a cylindrical metallic member of Comparative Example 3 and an exhaust gas processing device of Comparative Example 3 were manufactured. However, in Comparative Example 3, the thickness of the mixed layer formed on the outer surface of the cylindrical metallic member of Comparative Example 3 was 600 µm. The other conditions are similar to those in Example 5.

Comparative Example 4

In a similar manner to Example 5, a cylindrical metallic member of Comparative Example 4 and an exhaust gas processing device of Comparative Example 4 were manufactured. However, in Comparative Example 4, the thickness of the mixed layer formed on the outer surface of the cylindrical metallic member of Comparative Example 4 was 20 µm. The other conditions are similar to those in Example 5.

Example 10

In a similar manner to Example 1, a cylindrical metallic member of Example 10 and an exhaust gas processing device of Example 10 were manufactured. However, in Example 10, an insulating layer is formed on an outer surface of an inner pipe.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending using a ball mill to thereby prepare first slurry.

This first slurry was sprayed to coat the outer surface of the inner pipe and dried for 2 hours at a room temperature of 25° C. Thereafter, the inner pipe was heated at 900° C. for 20 minutes to form a mixed layer of the crystalline metal oxide and the amorphous binder on the outer surface of the inner pipe. The thickness of the mixed layer was 5 µm.

Then, water of 100 parts by weight was added to the silicate glass powder containing barium of 100 parts by weight. The water and mixed powder underwent wet blending using a ball mill to thereby prepare second slurry.

This second slurry was sprayed to coat the mixed layer formed on the outer surface of the inner pipe and dried for 2 hours at a room temperature of 25° C. The inner pipe was heated at a temperature of 900° C. for 20 minutes to thereby form a glass layer on the mixed layer of the inner pipe. The thickness of the glass layer was 20 µm.

The inner pipe is referred to as a cylindrical metallic member of Example 10.

An exhaust gas processing device of Example 10 was manufactured in a similar manner to Example 1 using the cylindrical metallic member of Example 10.

Example 11

In a similar manner to Example 10, a cylindrical metallic member of Example 11 and an exhaust gas processing device of Example 11 were manufactured. However, in Example 11, the thickness of the mixed layer formed on the outer surface of the cylindrical metallic member of Example 11 was 200 µm. The other conditions are similar to those in Example 10.

Example 12

In a similar manner to Example 10, a cylindrical metallic member of Example 12 and an exhaust gas processing device of Example 12 were manufactured. However, in Example 12, the thickness of the mixed layer formed on the outer surface of the cylindrical metallic member of Example 12 was 50 µm,
and the thickness of the glass layer was 25 µm. The other conditions are similar to those in Example 10.

Example 13

In a similar manner to Example 10, a cylindrical metallic member of Example 13 and an exhaust gas processing device of Example 13 were manufactured. With Example 13, the first slurry is prepared as follows.

Aluminum oxide powder ($Al_2O_3$) and silicate glass powder containing barium underwent dry blending in a weight ratio of $Al_2O_3$:silicate glass powder of 10:90 to obtain mixed powder. Water of 100 parts by weight is added to the mixed powder of 100 parts by weight. Then, the water and mixed powder underwent wet blending using a ball mill to thereby prepare first slurry.

The other conditions are similar to those in Example 10 except for the use of this first slurry.

However, in Example 14, the thickness of the mixed layer formed on the outer surface of the cylindrical metallic member of Example 14 was 50 µm, and the thickness of the glass layer was 25 µm.

Example 14

In a similar manner to Example 10, a cylindrical metallic member of Example 14 and an exhaust gas processing device of Example 14 were manufactured. With Example 14, first slurry was prepared as follows.

Manganese oxide powder ($MnO_2$) and silicate glass powder containing barium underwent dry blending in a weight ratio of $MnO_2$:silicate glass powder of 15:85 to obtain mixed powder. Water of 100 parts by weight is added to the mixed powder of 100 parts by weight. Then, the water and mixed powder underwent wet blending using a ball mill to thereby prepare the first slurry.

The other conditions are similar to those in Example 10 except for the use of this first slurry.

The thickness of the mixed layer formed on the outer surface of the cylindrical metallic member of Example 14 was 50 µm, and the thickness of the glass layer was 25 µm.

Comparative Example 5

In a similar manner to Example 10, a cylindrical metallic member of Comparative Example 5 and an exhaust gas processing device of Comparative Example 5 were manufactured. The thickness of the mixed layer formed on the outer surface of the cylindrical metallic member of Comparative Example 5 was 300 µm, and the thickness of the glass layer was 300 µm. The other conditions are similar to those in Example 10.

Comparative Example 6

In a similar manner to Example 10, a cylindrical metallic member of Comparative Example 6 and an exhaust gas processing device of Comparative Example 6 were manufactured. The thickness of the mixed layer formed on the outer surface of the cylindrical metallic member of Example 6 was 5 µm, and the thickness of the glass layer was 20 µm. The other conditions are similar to those in Example 10.

Comparative Example 7

In a similar manner to Example 10, a cylindrical metallic member of Comparative Example 7 and an exhaust gas processing device of Comparative Example 7 were manufactured. The thickness of the mixed layer formed on the outer surface of the cylindrical metallic member of Comparative Example 7 was 10 μm, and the thickness of the glass layer was 10 μm. The other conditions are similar to those in Example 10.

Example 15

With the following method, a cylindrical metallic member having the insulating layer is manufactured. Further, an exhaust gas processing device including the cylindrical metallic member is manufactured.
(Manufacture of the Cylindrical Metallic Member)
The cylindrical metallic member is made of a steel pipe of SUS304 having an outer diameter of 105 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 μm after sandblasting the steel pipe.

Next, the insulating layer was formed on the inner surface of the steel pipe of SUS304.

First, water of 100 parts by weight is added to silicate glass powder containing barium of 100 parts by weight. The water and silicate glass powder underwent wet blending using a ball mill to thereby prepare slurry.

The slurry was sprayed to coat the inner surface of the steel pipe of SUS304 and dried for 2 hours at a room temperature of 25° C. The steel pipe of SUS304 was heated at 900° C. for 20 minutes to thereby form a glass layer on the inner surface of the steel pipe of SUS304. The thickness of the glass layer was 80 μm.

The steel pipe of SUS304 is referred to as "a cylindrical metallic member of Example 15".
(Manufacture of the Exhaust Gas Processing Device)
An exhaust gas processing device of Example 15 was manufactured in a similar manner to Example 1 except for the use of the cylindrical metallic member of Example 15 as the inner pipe.

Example 16

With the following method, a cylindrical metallic member having an insulating layer is manufactured. Further, an exhaust gas processing device including the cylindrical metallic member is manufactured.
(Manufacture of the Cylindrical Metallic Member)
The cylindrical metallic member is made of a steel pipe of SUS304 having an outer diameter of 105 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 μm after sandblasting the steel pipe.

Next, the insulating layer was formed on the inner surface of the steel pipe of SUS304.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending to thereby prepare slurry.

This slurry was sprayed to coat the inner surface of the steel pipe of SUS304 and dried for 2 hours at a room temperature of 25° C. The steel pipe of SUS304 was heated at 900° C. for 20 minutes to thereby form a mixed layer of crystalline metal oxide and amorphous binder on the inner surface of the steel pipe of SUS304. The thickness of the mixed layer was 100 μm.

The steel pipe of SUS304 is referred to as "a cylindrical metallic member of Example 16".
(Manufacture of the Exhaust Gas Processing Device)
An exhaust gas processing device of Example 16 was manufactured in a similar manner to Example 1 except for the use of the cylindrical metallic member of Example 16 as the inner pipe.

Example 17

With the following method, a cylindrical metallic member having an insulating layer is manufactured. Further, an exhaust gas processing device including the cylindrical metallic member is manufactured.
(Manufacture of the Cylindrical Metallic Member)
The cylindrical metallic member is made of a steel pipe of SUS304 having an outer diameter of 105 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 μm after sandblasting the steel pipe.

Next, the insulating layer was formed on the inner surface of the steel pipe of SUS304.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending using a ball mill to thereby prepare first slurry.

This first slurry was sprayed to coat the inner surface of the steel pipe of SUS304 and dried for 2 hours at a room temperature of 25° C. The steel pipe of SUS304 was heated at 900° C. for 20 minutes to thereby form a mixed layer of crystalline metal oxide and amorphous binder on the inner surface of the steel pipe of SUS304. The thickness of the mixed layer was 5 μm.

Then, water of 100 parts by weight was added to the silicate glass powder containing barium of 100 parts by weight. The water and mixed powder underwent wet blending using a ball mill to thereby prepare second slurry.

This second slurry was sprayed to coat the mixed layer formed on the inner surface of the steel pipe of SUS304 and dried for 2 hours at a room temperature of 25° C. Thereafter, the steel pipe of SUS304 was heated at 900° C. for 20 minutes to thereby form the mixed layer on the inner surface of the steel pipe of SUS304. The thickness of the glass layer was 20 μm.

The steel pipe of SUS304 is referred to as "a cylindrical metallic member of Example 17".
(Manufacture of the Exhaust Gas Processing Device)

An exhaust gas processing device of Example 17 was manufactured in a similar manner to Example 1 except for the use of the cylindrical metallic member of Example 17 as the inner pipe.

Example 18

With the following method, a cylindrical metallic member having an insulating layer is manufactured. Further, an exhaust gas processing device including the cylindrical metallic member was manufactured.
(Manufacture of the Cylindrical Metallic Member)

The cylindrical metallic member is made of a steel pipe of SUS304 having an outer diameter of 135 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 µm after sandblasting the steel pipe.

Next, the insulating layer was formed on the inner surface of the steel pipe of SUS304 in a similar manner to Example 15. The steel pipe of SUS304 is referred to as "a cylindrical metallic member of Example 18".
(Manufacture of the Exhaust Gas Processing Device)

The exhaust gas processing device having the structure illustrated in FIG. 18 was manufactured as follows.

The honeycomb structure 910 was a cylindrical honeycomb structure having an inner diameter of 93 mm and a total length of 100 mm as illustrated in FIG. 11. The honeycomb units forming the honeycomb structure 910 were made of silicon carbide.

A probe electrode for measurement 940A made of aluminum was attached to a side surface of the honeycomb structure 910. The probe electrode for measurement 940A has dimensions of a total length of 100 mm, a width of 10 mm and a thickness of 0.3 mm. The probe electrode for measurement 940A was fixed to the side surface of the honeycomb structure 910 using a commercially available insulating tape.

The first inorganic mat member 920 was wound around the side surface of the honeycomb structure 910. The first inorganic mat member 920 is made of alumina fiber. The width of the first inorganic mat member 920 in the width direction of FIG. 18 is 30 mm.

Next, the honeycomb structure around which the first inorganic member 920 was wound was press-fit into the first cylindrical metallic member 930. The thickness of the first inorganic mat member 920 accommodated in the first cylindrical metallic member 930 was 4 mm. The first cylindrical metallic member 930 was made of a steel pipe of SUS304 having an outer diameter of 105 mm, a wall thickness of 2 mm and a total length of 90 mm. The second inorganic mat member 950 was wound around the side surface of the first cylindrical metallic member 930. The second inorganic mat member 950 was made of alumina fiber. The width of the second inorganic mat member 950 in the width direction of FIG. 18 was 30 mm.

An assembly in which the second mat member 950 was further assembled was press-fit into the cylindrical metallic member 960 of Example 18. The thickness of the second inorganic mat member 950 accommodated in the first cylindrical metallic member 960 was 13 mm.

Another probe electrode for measurement 940B made of aluminum was located on the outer surface of the second cylindrical metallic member 960. The probe electrode for measurement 940B has dimensions of a total length of 100 mm, a width of 10 mm and a thickness of 0.3 mm. The probe electrode for measurement 940B was fixed to the outer surface of the cylindrical metallic member 960 of Example 18 by a commercially available insulating tape.

The exhaust gas processing device 900 obtained as above is referred to as "an exhaust gas processing device of Example 18".

Example 19

With the following method, a cylindrical metallic member having an insulating layer was manufactured. Further, an exhaust gas processing device including the cylindrical metallic member was manufactured.
(Manufacture of the Cylindrical Metallic Member)

The cylindrical metallic member is made of a steel pipe of SUS304 having an outer diameter of 135 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 µm after sandblasting the steel pipe.

Next, the insulating layer was formed on the inner surface of the steel pipe of SUS304.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending to thereby prepare slurry.

This slurry was sprayed to coat the inner surface of the steel pipe of SUS304 and dried for 2 hours at a room temperature of 25° C. The steel pipe of SUS304 was heated at 900° C. for 20 minutes to thereby form a mixed layer of crystalline metal oxide and amorphous binder on the inner surface of the steel pipe of SUS304. The thickness of the mixed layer was 100 µm.

The steel pipe of SUS304 is referred to as "a cylindrical metallic member of Example 19".
(Manufacture of the Exhaust Gas Processing Device)

An exhaust gas processing device of Example 29 was manufactured in a similar manner to Example 1 except for a use of the cylindrical metallic member of Example 19 as an outer steel pipe of SUS304 (hereinafter, referred to as an outer pipe).

Example 20

With the following method, a cylindrical metallic member having an insulating layer was manufactured. Further, an exhaust gas processing device including the cylindrical metallic member was manufactured.
(Manufacture of the Cylindrical Metallic Member)

The cylindrical metallic member is made of a steel pipe of SUS304 having an outer diameter of 135 mm, a wall thickness of 2 mm and a total length of 90 mm. Before using the steel pipe of SUS304, the steel pipe of SUS304 underwent ultrasonic cleaning in alcohol.

The inner surface of the steel pipe of SUS304 underwent sandblasting. In sandblasting, alumina abrasive grain of an abrasive number #80 was used and a treatment time was 10 minutes. The maximum height Rz of the inner surface of the steel pipe of SUS304 is 2.5 μm after sandblasting the steel pipe.

Next, the insulating layer was formed on the inner surface of the steel pipe of SUS304.

Manganese oxide powder ($MnO_2$), ferric oxide powder (FeO), copper oxide (CuO), and silicate glass powder containing barium underwent dry blending in a weight ratio of $MnO_2$:FeO:CuO:silicate glass powder of 30:5:5:60 to obtain mixed powder. Water of 100 parts by weight is added to the mixed powder of 100 parts by weight. Then, the water and mixed powder underwent wet blending using a ball mill to thereby prepare first slurry.

This first slurry was sprayed to coat the inner surface of the steel pipe of SUS304 and dried for 2 hours at a room temperature of 25° C. Thereafter, the steel pipe of SUS304 was heated at 900° C. for 20 minutes to thereby form a mixed layer of crystalline metal oxide and amorphous binder on the inner surface of the steel pipe of SUS304. The thickness of the mixed layer was 5 μm.

Then, water of 100 parts by weight was added to the silicate glass powder containing barium of 100 parts by weight. The water and mixed powder underwent wet blending using a ball mill to thereby prepare second slurry.

This second slurry was sprayed to coat the mixed layer formed on the inner surface of the steel pipe of SUS304 and dried for 2 hours at a room temperature of 25° C. Thereafter, the steel pipe of SUS304 was heated at 900° C. for 20 minutes to thereby form a glass layer on the mixed layer of the steel pipe of SUS304. The thickness of the glass layer was 20 μm.

The steel pipe of SUS304 is referred to as "a cylindrical metallic member of Example 20".

(Manufacture of the Exhaust Gas Processing Device)

An exhaust gas processing device of Example 20 was manufactured in a similar manner to Example 18 except for the use of the cylindrical metallic member of Example 20.

Tables 1, 2 and 3 illustrate the compositions, layer thicknesses and locations of the insulating layers of the cylindrical metallic members of Examples 1-20 and Comparative Examples 1-7.

TABLE 1

| | | INSULATING LAYER | | | | EVALUATION RESULT | |
|---|---|---|---|---|---|---|---|
| | STRUCTURE | COMPOSITION (wt %) | THICKNESS OF FIRST LAYER (μm) | THICKNESS OF SECOND LAYER (μm) | LOCATION | ADHESION | MEASURED RESISTANCE (Ω) |
| EXAMPLE 1 | GLASS LAYER (SINGLE LAYER) | SILICATE GLASS CONTAINING BARIUM | 30 | — | OUTER SURFACE OF FIRST CYLINDRICAL METALLIC MEMBER | GOOD | $5.0 \times 10^8$ |
| EXAMPLE 2 | GLASS LAYER (SINGLE LAYER) | SILICATE GLASS CONTAINING BARIUM | 20 | — | OUTER SURFACE OF FIRST CYLINDRICAL METALLIC MEMBER | GOOD | $3.0 \times 10^8$ |
| EXAMPLE 3 | GLASS LAYER (SINGLE LAYER) | SILICATE GLASS CONTAINING BARIUM | 80 | — | OUTER SURFACE OF FIRST CYLINDRICAL METALLIC MEMBER | GOOD | $1.0 \times 10^9$ |
| EXAMPLE 4 | GLASS LAYER (SINGLE LAYER) | SILICATE GLASS CONTAINING BARIUM | 400 | — | OUTER SURFACE OF FIRST CYLINDRICAL METALLIC MEMBER | GOOD | $7.0 \times 10^9$ |
| COMPARATIVE EXAMPLE 1 | GLASS LAYER (SINGLE LAYER) | SILICATE GLASS CONTAINING BARIUM | 8 | — | OUTER SURFACE OF FIRST CYLINDRICAL METALLIC MEMBER | GOOD | $4.0 \times 10^4$ OR LESS |
| COMPARATIVE EXAMPLE 2 | GLASS LAYER (SINGLE LAYER) | SILICATE GLASS CONTAINING BARIUM | 600 | — | OUTER SURFACE OF FIRST CYLINDRICAL METALLIC MEMBER | PEEL-OFF | $1.0 \times 10^{10}$ |
| EXAMPLE 5 | MIXED LAYER (SINGLE LAYER) | $MnO_2$:FeO:CuO: AMORPHOUS BINDER (30:5:5:60) | 50 | — | OUTER SURFACE OF FIRST CYLINDRICAL METALLIC MEMBER | GOOD | $9.0 \times 10^5$ |
| EXAMPLE 6 | MIXED LAYER (SINGLE LAYER) | $MnO_2$:FeO:CuO: AMORPHOUS BINDER (30:5:5:60) | 100 | — | OUTER SURFACE OF FIRST CYLINDRICAL METALLIC MEMBER | GOOD | $2.0 \times 10^6$ |
| EXAMPLE 7 | MIXED LAYER (SINGLE LAYER) | $MnO_2$:FeO:CuO: AMORPHOUS BINDER (30:5:5:60) | 400 | — | OUTER SURFACE OF FIRST CYLINDRICAL METALLIC MEMBER | GOOD | $7.0 \times 10^6$ |
| EXAMPLE 8 | MIXED LAYER (SINGLE LAYER) | $Al_2O_3$: AMORPHOUS BINDER (10:90) | 100 | — | OUTER SURFACE OF FIRST CYLINDRICAL METALLIC MEMBER | GOOD | $2.0 \times 10^{10}$ |

TABLE 1-continued

|  | | INSULATING LAYER | | | | EVLUATION | |
|---|---|---|---|---|---|---|---|
|  | STRUCTURE | COMPOSITION (wt %) | THICKNESS OF FIRST LAYER (μm) | THICKNESS OF SECOND LAYER (μm) | LOCATION | ADHE-SION | MEASURED RESISTANCE (Ω) |
| EXAMPLE 9 | MIXED LAYER (SINGLE LAYER) | $MnO_2$: AMORPHOUS BINDER (15:85) | 100 | — | OUTER SURFACE OF FIRST CYLINDRICAL METALLIC MEMBER | GOOD | $2.0 \times 10^8$ |
| COMPARATIVE EXAMPLE 3 | MIXED LAYER (SINGLE LAYER) | $MnO_2$:FeO:CuO: AMORPHOUS BINDER (30:5:5:60) | 600 | — | OUTER SURFACE OF FIRST CYLINDRICAL METALLIC MEMBER | PEEL-OFF | $1.0 \times 10^7$ |
| COMPARATIVE EXAMPLE 4 | MIXED LAYER (SINGLE LAYER) | $MnO_2$:FeO:CuO: AMORPHOUS BINDER (30:5:5:60) | 20 | — | OUTER SURFACE OF FIRST CYLINDRICAL METALLIC MEMBER | GOOD | $4.0 \times 10^4$ OR LESS |

TABLE 2

|  | | INSULATING LAYER | | | | EVALUATION | |
|---|---|---|---|---|---|---|---|
|  | STRUCTURE | COMPOSITION (wt %) | THICKNESS OF FIRST LAYER (μm) | THICKNESS OF SECOND LAYER (μm) | LOCATION | ADHE-SION | MEASURED RESISTANCE (Ω) |
| EXAMPLE 10 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 5 | 20 | OUTER SURFACE OF FIRST CYLINDRICAL METALLIC MEMBER | GOOD | $3.0 \times 10^8$ |
| EXAMPLE 11 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 200 | 200 | OUTER SURFACE OF FIRST CYLINDRICAL METALLIC MEMBER | GOOD | $3.0 \times 10^9$ |
| EXAMPLE 12 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 50 | 25 | OUTER SURFACE OF FIRST CYLINDRICAL METALLIC MEMBER | GOOD | $4.0 \times 10^8$ |
| EXAMPLE 13 | MIXED LAYER (FIRST LAYER) + GLASS LAYER (SECOND LAYER) | FIRST LAYER $Al_2O_3$:AMORPHOUS BINDER (10:90) SECOND LAYER SILICATE GLASS CONTAINING BARIUM | 50 | 25 | OUTER SURFACE OF FIRST CYLINDRICAL METALLIC MEMBER | GOOD | $9.0 \times 10^9$ |
| EXAMPLE 14 | MIXED LAYER (FIRST LAYER) + GLASS LAYER (SECOND LAYER) | FIRST LAYER $MnO_2$:AMORPHOUS BINDER (15:85) SECOND LAYER SILICATE GLASS CONTAINING BARIUM | 50 | 25 | OUTER SURFACE OF FIRST CYLINDRICAL METALLIC MEMBER | GOOD | $5.0 \times 10^8$ |
| COMPARATIVE EXAMPLE 5 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 300 | 300 | OUTER SURFACE OF FIRST CYLINDRICAL METALLIC MEMBER | PEEL-OFF | $5.0 \times 10^9$ |

TABLE 2-continued

| | | INSULATING LAYER | | | | EVALUATION RESULT | |
|---|---|---|---|---|---|---|---|
| | STRUCTURE | COMPOSITION (wt %) | THICKNESS OF FIRST LAYER (μm) | THICKNESS OF SECOND LAYER (μm) | LOCATION | ADHE-SION | MEASURED RESISTANCE (Ω) |
| COMPAR-ATIVE EXAMPLE 6 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 20 | 5 | OUTER SURFACE OF FIRST CYLINDRICAL METALLIC MEMBER | GOOD | $4.0 \times 10^4$ OR LESS |
| COMPAR-ATIVE EXAMPLE 7 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 10 | 10 | OUTER SURFACE OF FIRST CYLINDRICAL METALLIC MEMBER | GOOD | $4.0 \times 10^4$ OR LESS |

TABLE 3

| | | INSULATING LAYER | | | | EVALUATION RESULT | |
|---|---|---|---|---|---|---|---|
| | STRUCTURE | COMPOSITION (wt %) | THICKNESS OF FIRST LAYER (μm) | THICKNESS OF SECOND LAYER (μm) | LOCATION | ADHE-SION | MEASURED RESISTANCE (Ω) |
| EXAMPLE 15 | GLASS LAYER (SINGLE LAYER) | SILICATE GLASS CONTAINING BARIUM | 80 | — | INNER SURFACE OF FIRST CYLINDRICAL METALLIC MEMBER | GOOD | $1.0 \times 10^9$ |
| EXAMPLE 16 | MIXED LAYER (SINGLE LAYER) | $MnO_2$:FeO:CuO: AMORPHOUS BINDER (30:5:5:60) | 100 | — | INNER SURFACE OF FIRST CYLINDRICAL METALLIC MEMBER | GOOD | $2.0 \times 10^6$ |
| EXAMPLE 17 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 5 | 20 | INNER SURFACE OF FIRST CYLINDRICAL METALLIC MEMBER | GOOD | $3.0 \times 10^8$ |
| EXAMPLE 18 | GLASS LAYER (SINGLE LAYER) | SILICATE GLASS CONTAINING BARIUM | 80 | — | INNER SURFACE OF SECOND CYLINDRICAL METALLIC | GOOD | $1.0 \times 10^9$ |
| EXAMPLE 19 | MIXED LAYER (SINGLE LAYER) | $MnO_2$:FeO:CuO: AMORPHOUS BINDER (30:5:5:60) | 100 | — | INNER SURFACE OF SECOND CYLINDRICAL METALLIC | GOOD | $2.0 \times 10^6$ |
| EXAMPLE 20 | MIXED LAYER (FIRST LAYER) + GLASS LAYER (SECOND LAYER) | FIRST LAYER $MnO_2$:FeO:CuO: AMORPHOUS BINDER (30:5:5:60) SECOND LAYER SILICATE GLASS CONTAINING BARIUM | 5 | 20 | INNER SURFACE OF SECOND CYLINDRICAL METALLIC | GOOD | $3.0 \times 10^8$ |

(Evaluation of Adhesion)

Evaluation test of adhesion of the insulating layers was carried out using the cylindrical metallic members of Examples 1-20 and Comparative Examples 1-7. The evaluation test of adhesion was a heat shock test.

The cylindrical metallic members of Examples 1-20 and Comparative Examples 1-7 were heated to be 850° C. The cylindrical metallic members which were heated were thrown into water having a temperature of 25° C. Thereafter, the cylindrical metallic members are retrieved to visually observe peel-off of the insulating layers.

The evaluation results of adhesion are indicated in the column of "ADHESION" of Tables 1 to 3. With the evaluation results of adhesion, the cylindrical metallic members of Examples 1-20 have good adhesion and do not cause peel-off. On the other hand, in the cylindrical metallic members of Comparative Examples 2, 3 and 5, the peel-off is caused after the evaluation test.

(Measured Resistance)

Next, the exhaust gas processing devices of Examples 1-20 and Comparative Examples 1-7 are used to measure values of resistance (volume resistance) of the exhaust gas processing devices. The resistance is measured by a resistance measurement instrument (a digital ultrahigh resistance/microammeter, type: R8340, manufactured by ADVANTEST CORPORATION). Specifically, the measurement is carried out as follows.

Before the measurement, distilled water having an electric resistivity of 0.1 to 1.0 M $\Omega \cdot cm$ at a temperature of 25° C. was poured into the first and second inorganic mat members 920 and 950 of the exhaust gas processing device 900. The electric resistivity was measured by an electric resistivity measuring instrument of model 7727-A100 manufactured by TECHNO-MORIOKA. The inorganic mat members 920 and 950 were sufficiently impregnated with water and soaked through.

Then, the electric resistivity measuring instrument is connected between a pair of probe electrodes for measurement 940A and 940B of the exhaust gas processing device. A voltage of 500 V is applied between the probe electrodes 940A and 940B and a resistance value between the probe electrodes 940A and 940B is measured.

Here, the resistance value in the insulating layer is not measured and the resistance value between the inorganic mat member 920 and 950 impregnated with water and the second cylindrical metallic member 960 is measured. With Examples 1 to 20 and Comparative Examples 1 to 7, the resistance values of the inorganic mat members 920 and 950 impregnated with the distilled water and the second cylindrical metallic member 960 are extremely low (e.g., $1/10^{18}$ to $1/10^{6}$ times) in comparison with the resistance value of the insulating layer. Therefore, the resistance values of the inorganic mat members 920 and 950 impregnated with the distilled water and the second cylindrical metallic member 960 do not substantially affect the resistance value of the insulating layer. If the resistance value between the inorganic mat member 920 and 950 impregnated with water and the second cylindrical metallic member 960 is measured, it is assumed that the resistance value of the insulating layer is substantially obtainable.

The measurement results of the resistance values of Examples 1-20 and Comparative Examples 1-7 are listed in the column of "MEASURED RESISTANCE" of Tables 1-3.

Referring to measurement results of resistances (Tables 1-3), the measured resistances of Comparative Example 1, Comparative Example 4, Comparative Example 6 and Comparative Example 7 are $4.0 \times 10^4 \Omega$ or less. On the other hand, the measured resistances of Examples 1 to 20 are more than $9.0 \times 10^5 \Omega$ or more. The resistance values of the exhaust gas processing devices of Examples 1 to 20 are larger than the resistance values of the exhaust gas processing devices of Comparative Examples 1, 4, 6 and 7 by at least 22 times or more. Thus, the good insulation properties are obtained.

According to the Examples of the embodiments of the present invention, the good insulation properties between the honeycomb structure and the second cylindrical metallic member are secured, and the exhaust gas processing device having excellent adhesion of the insulating layer is obtainable.

According to the embodiment of the present invention, it is possible to provide the exhaust gas processing device which can prevent an electric current from leaking into components other than the honeycomb structure.

Obviously, numerous modifications and variations of the present invention are possible in light of the above teachings. It is therefore to be understood that within the scope of the appended claims, the invention may be practiced otherwise than as specifically described herein.

What is claimed is:

1. An exhaust gas processing device comprising:
   a first cylindrical metallic member;
   an inorganic mat member wound around an outer periphery of the first cylindrical metallic member;
   a second cylindrical metallic member accommodating the first cylindrical metallic member around which the inorganic mat member is wound; and
   an insulating layer having a thickness of about 20 μm to about 400 μm and provided at at least one of a first part which is an inner surface of the first cylindrical metallic member, a second part between an outer surface of the first cylindrical metallic member and the inorganic mat member, and a third part between an inner surface of the second cylindrical metallic member and the inorganic mat member.

2. The exhaust gas processing device according to claim 1, wherein the insulating layer includes a glass layer.

3. The exhaust gas processing device according to claim 1, wherein the insulating layer includes a mixed layer including an amorphous binder and crystalline metal oxide and has a thickness in a range of 50 to 400 μm.

4. The exhaust gas processing device according to claim 3, wherein the crystalline metal oxide is at least one of ferric oxide, cobalt oxide, copper oxide, manganese oxide, chrome oxide and aluminum oxide.

5. The exhaust gas processing device according to claim 1, wherein the insulating layer includes a glass layer and a mixed layer including an amorphous binder and crystalline metal oxide,
   wherein the mixed layer of the insulating layer on the first part is formed between the inner surface of the first cylindrical metallic member and the glass layer, the mixed layer of the insulating layer on the second part is formed between the outer surface of the first cylindrical metallic member and the glass layer, or the mixed layer of the insulating layer on the third part is formed between the inner surface of the second cylindrical metallic member and the glass layer,
   wherein a thickness of the glass layer is 20 μm or more, a thickness of a mixed layer is 50 μm or more, or the thickness of the glass layer is 20 μm or more and the thickness of the mixed layer is 50 μm or more.

6. The exhaust gas processing device according to claim 5, wherein the mixed layer of the insulating layer on the first part and/or the mixed layer of the insulating layer on the second part have a coefficient of thermal expansion between coefficients of the thermal expansion of the first cylindrical metallic member and the glass layer, and the mixed layer of the insulating layer on the third part has a coefficient of thermal expansion between coefficients of the thermal expansion of the second cylindrical metallic member and the glass layer.

7. The exhaust gas processing device according to claim 5, wherein the mixed layer has a coefficient of thermal expansion in a range between $0.6 \times 10^{-6}/°$ C. to $17 \times 10^{-6}/°$ C.

8. The exhaust gas processing device according to claim 1, wherein a thickness of the inorganic mat member is 1 mm to 20 mm where the second cylindrical metallic member accommodates the first cylindrical metallic member around which the inorganic mat member is wound.

9. The exhaust gas processing device according to claim 1, wherein the insulating layer is provided only on the second part between an outer surface of the first cylindrical metallic member and the inorganic mat member.

10. The exhaust gas processing device according to claim 1, wherein at least one of the first cylindrical metallic member and the second cylindrical metallic member is made of stainless steel or a nickel base alloy.

11. The exhaust gas processing device according to claim 1, wherein the insulating layer is provided only at the first part.

12. The exhaust gas processing device according to claim 1, wherein the insulating layer is provided at both of the first part and the second part.

13. The exhaust gas processing device according to claim 1, wherein the insulating layer is provided only at the third part.

14. The exhaust gas processing device according to claim 1, wherein the insulating layer is provided at both of the second part and the third part.

15. The exhaust gas processing device according to claim 1, wherein the insulating layer is provided at both of the first part and the third part.

16. The exhaust gas processing device according to claim 1, wherein the insulating layer is provided at all of the first part, the second part, and the third part.

17. The exhaust gas processing device according to claim 1, wherein the amorphous inorganic material includes barium glass, boron glass, strontium glass, alumina silicate glass, soda-zinc glass, or soda-barium glass.

18. The exhaust gas processing device according to claim 1, wherein density of the inorganic mat member is in a range of about 0.05 g/cm³ to about 0.5 g/cm³ when the inorganic mat member is accommodated in the second cylindrical metallic member.

* * * * *